(12) United States Patent
Gillard et al.

(10) Patent No.: US 9,747,870 B2
(45) Date of Patent: Aug. 29, 2017

(54) METHOD, APPARATUS, AND COMPUTER-READABLE MEDIUM FOR SUPERIMPOSING A GRAPHIC ON A FIRST IMAGE GENERATED FROM CUT-OUT OF A SECOND IMAGE

(71) Applicant: Sony Corporation, Minato-ku (JP)

(72) Inventors: Clive Henry Gillard, Alton (GB); Michael John Williams, Winchester (GB); Robert Mark Stefan Porter, Winchester (GB); Paul Edward Prayle, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 14/492,520

(22) Filed: Sep. 22, 2014

(65) Prior Publication Data

US 2015/0138188 A1    May 21, 2015

(30) Foreign Application Priority Data

Nov. 15, 2013  (GB) .................................. 1320219.7

(51) Int. Cl.
*H04N 5/272* (2006.01)
*G09G 5/377* (2006.01)
(Continued)

(52) U.S. Cl.
CPC ............. *G09G 5/377* (2013.01); *G06T 15/00* (2013.01); *G06T 19/006* (2013.01);
(Continued)

(58) Field of Classification Search
None
See application file for complete search history.

(56) References Cited

U.S. PATENT DOCUMENTS 5,566,251 A   10/1996  Hanna et al.
6,057,833 A   5/2000   Heidmann et al.
(Continued)

FOREIGN PATENT DOCUMENTS

GB    2 452 512         11/2009
JP    2011-248630       12/2011
WO    WO 2011/121117 A1 10/2011

*Primary Examiner* — Said Broome
(74) *Attorney, Agent, or Firm* — Oblon, McClelland, Maier & Neustadt, L.L.P.

(57) ABSTRACT

Embodiments of the present disclosure provide a device for generating a graphic and superimposing the generated graphic on a second image generated from a cut-out of a first image of a scene, the cut-out representing the field of view of a virtual camera, the device comprising: receiver circuitry configured to receive the second image and a set of cut-out corner coordinates; homography determining circuitry configured to determine, a homography between coordinates of the first 2D coordinate system defined within the cut-out and coordinates of a second 2D coordinate system defined for the second image; feature determining circuitry configured to determine a feature of the virtual 3D map of the scene within the field of view of the virtual camera; graphic generator circuitry configured to generate the graphic from the determined feature of the virtual 3D map; and graphic superimposing circuitry configured to superimpose the generated graphic on the second image.

12 Claims, 22 Drawing Sheets

(51) Int. Cl.
*G06T 15/00* (2011.01)
*G06T 19/00* (2011.01)
*H04N 5/262* (2006.01)

(52) U.S. Cl.
CPC ........... *H04N 5/2628* (2013.01); *H04N 5/272* (2013.01); *G09G 2340/12* (2013.01)

(56) References Cited

U.S. PATENT DOCUMENTS

| | | |
|---|---|---|
| 8,279,286 B2 | 10/2012 | Wagg et al. |
| 2009/0059007 A1* | 3/2009 | Wagg ................ G06K 9/00369 348/157 |
| 2009/0237510 A1 | 9/2009 | Chen et al. |
| 2011/0052093 A1* | 3/2011 | Porter .................... G03B 37/04 382/284 |
| 2011/0216167 A1* | 9/2011 | Katz .................. H04N 13/0018 348/47 |

* cited by examiner

| Time | Target P Position (xp,yp) | Zoom (mm) | Damping coefficient |
|---|---|---|---|
| 0:00:00 | (-0.51, 0.06) | 205 | 0.1 |
| 0:03:12 | (-0.29, 0.04) | 127 | 0.1 |
| 0:05:56 | (0.00, 0.00) | 85 | 0.1 |
| 0:07:28 | (0.00, 0.00) | 35 | 0.3 |
| 0:10:14 | End | End | End |

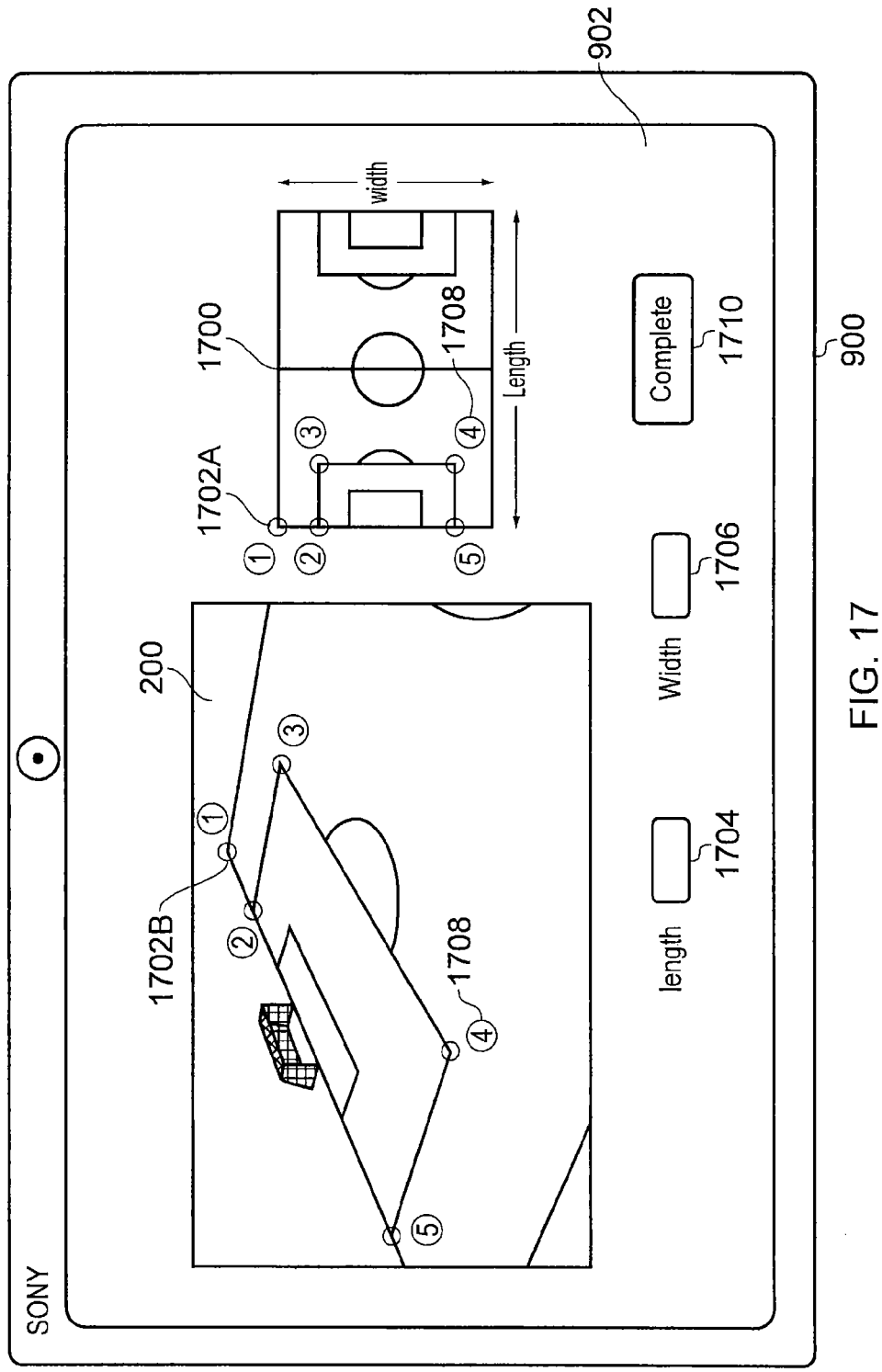

| Time:1 | | |
|---|---|---|
| Name of point | Position of point | L*a*b value |
| 1810 | $P_1$ | |
| 1811 | $P_2$ | |
| 1812 | $P_3$ | $L^*a^*b_3$ |
| 1813 | $P_4$ | |
| 1814 | $P_5$ | |
| 1815 | $P_6$ | |
| 1816 | $P_7$ | $L^*a^*b_7$ |
| 1817 | $P_8$ | $L^*a^*b_8$ |

| Time:2 | | |
|---|---|---|
| Name of point | Position of point | L*a*b value |
| 1810 | $P_1$ | |
| 1811 | $P_2$ | $L^*a^*b_2$ |
| 1812 | $P_3$ | |
| 1813 | $P_4$ | $L^*a^*b_4$ |
| 1814 | $P_5$ | |
| 1815 | $P_6$ | |
| 1816 | $P_7$ | |
| 1817 | $P_8$ | |

| Time:N | | |
|---|---|---|
| Name of point | Position of point | L*a*b value |
| 1810 | $P_1$ | $L^*a^*b_1$ |
| 1811 | $P_2$ | |
| 1812 | $P_3$ | $L^*a^*b_3$ |
| 1813 | $P_4$ | |
| 1814 | $P_5$ | |
| 1815 | $P_6$ | |
| 1816 | $P_7$ | $L^*a^*b_7$ |
| 1817 | $P_8$ | |

FIG. 19

METHOD, APPARATUS, AND COMPUTER-READABLE MEDIUM FOR SUPERIMPOSING A GRAPHIC ON A FIRST IMAGE GENERATED FROM CUT-OUT OF A SECOND IMAGE

CROSS REFERENCE TO RELATED APPLICATIONS

The present application claims priority to United Kingdom Application GB 1320219.7 filed on 15 Nov. 2013, the contents of which being incorporated herein by reference in its entirety.

BACKGROUND

Field of the Disclosure

The present disclosure relates to a method, apparatus and system for image processing.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

It is currently possible to produce zoomed-in images of a scene using a large, high resolution image and a virtual camera. In such a system, the only real image which is captured is the large, high resolution image. Zoomed-in images are created entirely electronically by selecting a portion (also known as a cut out) of the large, high resolution image and displaying this portion. For example, a high definition (HD) cut out can be obtained from a 4 k or 8 k image. The shape of the cut-out can be changed so as to change the perspective of the resulting zoomed-in image that is displayed. This allows the electronically-produced zoomed-in image to have the characteristics of an image which has been captured by a real camera which is panned across a scene. A method of producing such perspective corrected zoomed-in images is disclosed in GB 1306050.4 the contents of which is hereby incorporated by reference, which may be referred to as Reference 1.

The problem with these electronically produced zoomed-in images, however, is that, since a real camera is not actually used to produce the image, it is difficult to use television illustrator (also known as telestrator) systems with the zoomed-in image. Telestrator systems are used for producing computer generated images on top of real life video images (for example, marking a player's offside position on a soccer pitch) and traditionally rely on mapping features in a real three-dimensional (3D) scene to features in a two-dimensional (2D) image of the scene captured by a real camera. This allows the telestrator to determine the correct position of a computer generated image, the computer generated image being based on a feature in the real 3D scene, within a captured video image frame. It is an object of the present disclosure to alleviate this problem.

SUMMARY

In once aspect, the present disclosure provides a device for superimposing a graphic on a second image generated from a cut-out of a first image of a scene, the cut-out representing the field of view of a virtual camera, the device comprising: receiver circuitry configured to receive the second image and a set of cut-out corner coordinates, each of the cut-out corner coordinates giving a position of a corner point of the cut-out in a first two-dimensional (2D) coordinate system defined for the first image; homography determining circuitry configured to determine, from the set of cut-out corner coordinates, a homography between coordinates of the first 2D coordinate system defined within the cut-out and coordinates of a second 2D coordinate system defined for the second image; feature determining circuitry configured to determine, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera; graphic generator circuitry configured to generate the graphic from the determined feature of the virtual 3D map; and graphic superimposing circuitry configured to superimpose the generated graphic on the second image.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be better understood by reference to the following detailed description when considered in connection with the accompanying drawings, wherein:

FIG. 12 shows data representing a recorded motion sequence of the virtual camera;

FIG. 17 shows an example of a user interface for performing a point matching process for use in calibration of the camera matrix;

FIG. 19 shows a memory stored within the telestrator.

DESCRIPTION OF THE EMBODIMENTS

Figure 1:
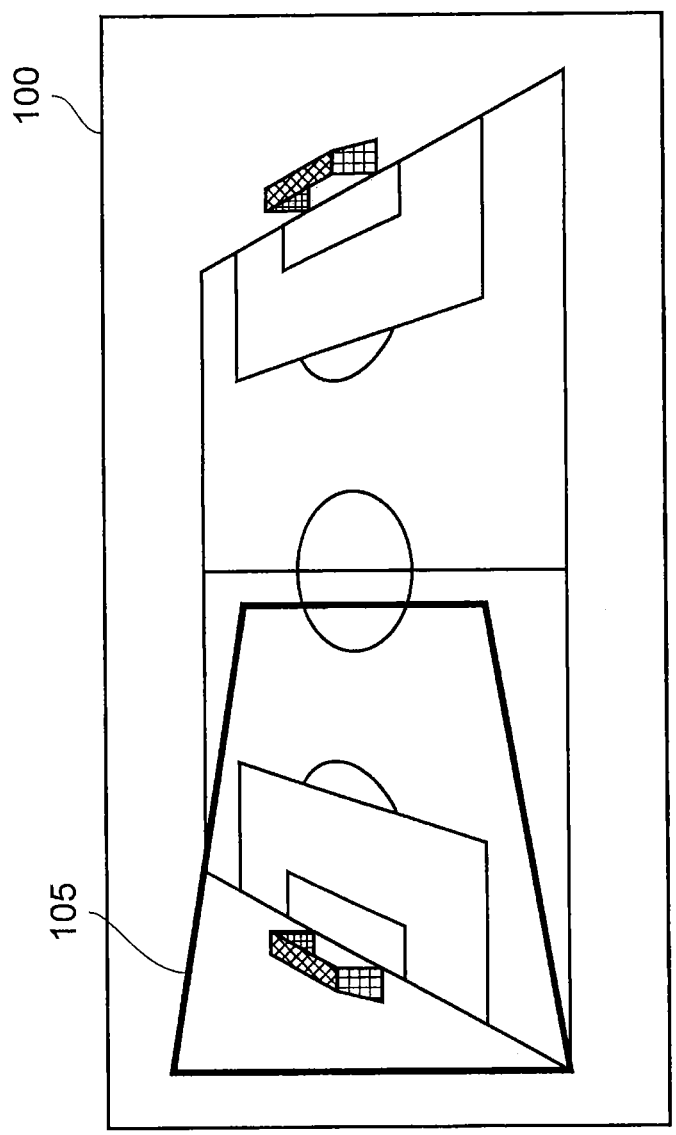
FIG. 1 shows a cut-out of an original image captured by a camera.

Embodiments of the present disclosure provide a device for superimposing a graphic on a second image generated from a cut-out of a first image of a scene, the cut-out representing the field of view of a virtual camera, the device comprising: receiver circuitry configured to receive the second image and a set of cut-out corner coordinates, each of the cut-out corner coordinates giving a position of a corner point of the cut-out in a first two-dimensional (2D) coordinate system defined for the first image; homography determining circuitry configured to determine, from the set of cut-out corner coordinates, a homography between coordinates of the first 2D coordinate system defined within the cut-out and coordinates of a second 2D coordinate system defined for the second image; feature determining circuitry configured to determine, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera; graphic generator circuitry configured to generate the graphic from the determined feature of the virtual 3D map; and graphic superimposing circuitry configured to superimpose the generated graphic on the second image.

Advantageously, through the use of the cut-out corner coordinates in the first 2D coordinate system of the first image to determine the homography, the amount of processing in determining a feature in the virtual 3D map of the scene from which a graphic is to be generated in the second image is reduced.

In some embodiments, the device comprises point selection circuitry configured to receive the selection of a single point in the first 2D coordinate system defined for the first image and determine, from the selected point, a yaw, pitch and roll of the virtual camera, the single point defining a point within the cut-out.

Advantageously, this provides an easy and convenient way for the user to select the yaw, pitch and roll of the virtual camera.

In some embodiments, upon selection of the single point and/or a focal length of the virtual camera, the yaw, pitch, roll and/or focal length of the virtual camera are gradually changed until the yaw, pitch and/or roll associated with the single point are reached and/or the selected focal length is reached; and as the yaw, pitch, roll and/or focal length of the virtual camera are gradually changed, a plurality of second images and respective sets of cut-out corner coordinates are successively received at a predetermined frame rate.

Advantageously, this allows the change in yaw, pitch and roll of the virtual camera to mimic that of a real camera as it is panned across the scene, making viewing more natural and comfortable for the user.

In some embodiments, the speed of the gradual change of the yaw, pitch, roll and/or focal length of the virtual camera is determined by a damping coefficient which is selectable by the user. Advantageously, this gives the user enhanced creative control of the virtual camera.

In some embodiments, the yaw, pitch, roll and/or focal length of the virtual camera are controlled in accordance with a predetermined virtual camera motion sequence, the virtual camera motion sequence being defined by a time sequence of selected single point, focal length and/or damping coefficients.

Advantageously, this allows the user to quickly select an appropriate motion sequence of the virtual camera in response to the need to film a certain event in the scene.

In some embodiments, a plurality of second images and respective sets of cut-out corner coordinates are received simultaneously; the yaw, pitch, roll and/or focal length of the virtual camera associated with a first one of the second images are different to the yaw, pitch, roll and/or focal length of the virtual camera associated with a second one of the second images; and the device comprises image combination circuitry configured to combine the first one of the second images and the second one of the second images to form a third image.

Advantageously, this allows multiple zoomed-in images of the scene to be taken from the original image (mimicking the use of multiple real cameras in the scene) and used to create a combined image, thus allowing the user to add production value.

In some embodiments, the yaw, pitch, roll and/or focal length of the virtual camera associated with the first one of the second images and the yaw, pitch, roll and/or focal length of the virtual camera associated with the second one of the second images are such that the cut-out corresponding to the second one of the second images is within the cut-out corresponding to the first one of the second images.

Advantageously, this allows the combined image to feature a zoomed-in/magnified portion, thus allowing the user to add production value.

In some embodiments, the device comprises calibration circuitry for determining the camera matrix using the received second image, the calibration circuitry being configured to: associate each of a plurality features of the virtual 3D map of the scene with a respective real image feature in the second image, and determine the position of each real image feature in the second 2D coordinate system of the second image; determine the position of each real image feature in the first 2D coordinate system of the first image using the homography; and determine the camera matrix from the position of each real image feature in the first 2D coordinate system of the first image and the 3D position of each respective feature in the virtual 3D map of the scene.

Advantageously, this allows more accurate determination of the camera matrix by being able to match image features in the second image with corresponding features in the scene. Since the second image is a zoomed-in version of the first image, image features to be matched are presented to the user in more detail.

Referring now to the drawings, wherein like reference numerals designate identical or corresponding parts throughout the several views.

FIG. 1 shows an image 100 of a soccer pitch which has been captured with a camera. A portion or cut out 105 of the image is also shown. The cut out 105 of the image can be taken and displayed as a zoomed-in image on a television or the like. The image 100 may have any suitable resolution. For example, the image 100 may have a 4 k or 8 k ultra high definition (UHD) resolution.

Figure 2:
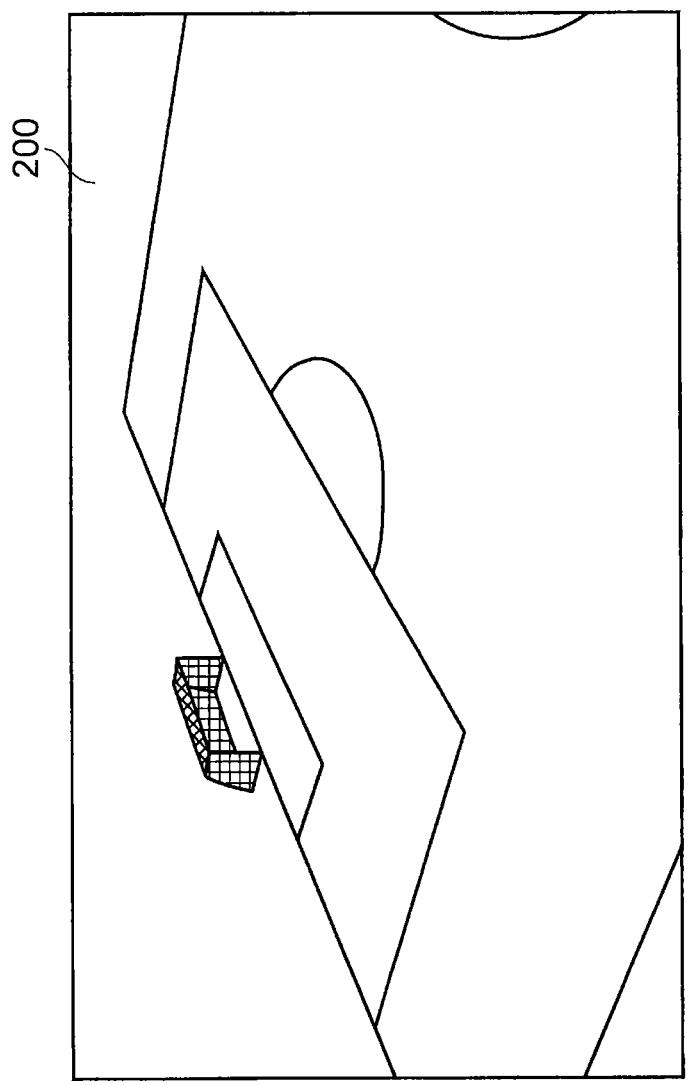
FIG. 2 shows a zoomed-in image generated from the cut-out.

FIG. 2 shows a zoomed-in image 200 generated from the cut out 105. The cut-out 105 has a shape which represents the field of view of a virtual camera which is panned across the image 100. The values of the pixels of the cut-out 105 are then mapped to a predetermined rectangular pixel arrangement in order to obtain the zoomed-in image 200. This means that the perspective of the zoomed-in image 200 is corrected so as to appear as though it has been captured with a real camera which has been panned across the real scene. The zoomed-in image 200 may have any suitable resolution. For example, the zoomed-in image may have a high definition (HD) resolution.

The way in which the shape of the cut-out 105 and the zoomed-in image 200 are generated is described in detail in Reference 1, the entire contents of which is incorporated herein by reference.

In order for a telestrator to be able to electronically draw images on the zoomed-in image 200 generated from the cut-out 105, the images being based on features in the real 3D scene, it is necessary for the telestrator to be able to map features in the real 3D scene to features in the 2D zoomed-in image 200 of the scene formed form the cut-out 105. In embodiments of the present disclosure, this is achieved by first mapping 3D coordinate points in the real 3D scene to 2D coordinate points in the 2D original image 100 during a telestrator calibration process. The mapping of 3D points in a scene to 2D points in an image of the scene is well known in the art, and typically involves applying a so-called projection matrix (also known as a camera matrix) to a 3D coordinate point position so as to obtain a corresponding 2D coordinate point position. The camera matrix comprises an intrinsic matrix which controls 2D scaling and centring and two extrinsic matrices which, together, specify the yaw, pitch, roll and translation of the camera which captures the image. Intrinsic and extrinsic parameters which define, respectively, the intrinsic and extrinsic matrices may be calculated using any suitable method known in the art. For example, a direct linear transform (DLT) method, Tsai's Algorithm or Zhang's method may be used for determining the intrinsic and extrinsic parameters. Tsai's algorithm is described in R. Y. Tsai, "An Efficient and Accurate Camera Calibration Technique for 3D Machine Vision". Proceedings of IEEE Conference on Computer Vision and Pattern Recognition, pp. 364-374, 1986, the entire contents of which is incorporated herein by reference.

Once the 3D coordinate points of the real 3D scene have been mapped to 2D coordinate points in the original image 100, the positions of the corners of the cut-out 105 in the 2D coordinate system of the original image 100 can then be used, in turn, to map relevant 3D coordinate points in the scene to 2D coordinate points in a different 2D coordinate system defined for the zoomed-in image 200. This is described in more detail with respect to FIG. 3 onwards. As will be explained, the additional mapping process using the corner points of the cut-out 105 is necessary since, due to the cut-out 105 having a non-rectangular shape due to perspective correction, it is not possible to use the 2D coordinate system defined for the original image 100 directly with the zoomed-in image 200.

As long as the telestrator is correctly calibrated (this is explained later), this mapping can be used by the telestrator in order to electronically draw virtual images on the zoomed-in image 200. That is, image features generated in a virtual 3D map of the scene can be appropriately mapped to pixel positions in the zoomed-in image 200. The virtual 3D map of the scene is comprised of graphical image features defined in the 3D coordinate system of the scene.

Figure 3:
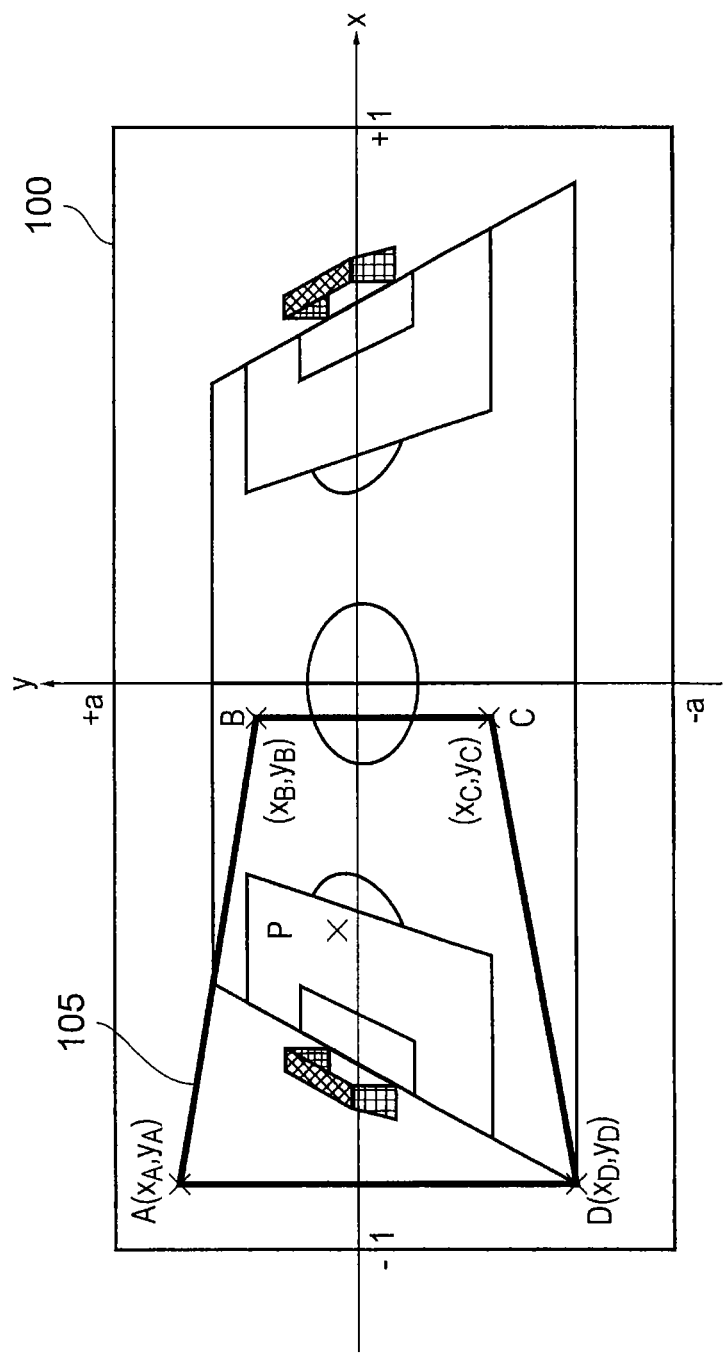
FIG. 3 shows the corner points of the cut-out.

FIG. 3 shows the image 100 and cut-out 105 of FIG. 1. However, it can now be seen that a 2D coordinate system has been defined for the image 100 and that the coordinates of the four corner points A, B, C and D of the cut-out 105 have been identified. Specifically, corner point A has position ($x_A$, $y_A$) in the 2D coordinate system, corner point B has position ($x_B$, $y_B$), corner point C has position ($x_C$, $y_C$) and corner point D has position ($x_D$, $y_D$). In this example, the 2D coordinate system has been implemented such that the rectangular image 100 extends from −1 to +1 in the x-direction and from −a to +a in the y-direction (where a=image height/image width). Of course, any other suitable limits, such as the coordinates extending from −1 to +1 in both the x and y directions, could be used.

Thus, advantageously, in embodiments, all that is required in order for the telestrator to know where to locate virtual images generated from a virtual 3D map of the scene on the zoomed-in image 200) are the coordinate positions of the corner points A, B, C and D in the predetermined 2D coordinate system of the captured image 100. These corner coordinate positions are generated as a matter of course during the generation of the cut-out 105. Specifically, as disclosed in Reference 1, in order to generate the cut-out 105, a predetermined rectangular plane is transformed according to the yaw, pitch, roll and zoom of a virtual camera to as to define the shape and position of the cut-out 105 with respect to a 2D coordinate system defined for an image of a scene. The transformed coordinates of the corners of this predetermined rectangular plane will be the coordinate positions of the corners A, B, C, and D shown in FIG. 3.

The corner coordinate positions can be received by the telestrator with each frame of the zoomed-in image 200 of the virtual camera. For example, the coordinate positions ($x_A$, $y_A$), ($x_B$, $y_B$), ($x_C$, $y_C$) and ($x_D$, $y_D$) can be included in the ancillary data of video packets of the zoomed-in video image 200. Alternatively, the coordinate positions can be received separately to the zoomed-in video image data. This could be via an Ethernet connection, for example. Of course, any suitable method may be used for transmitting the coordinate positions to the telestrator.

Figure 4:
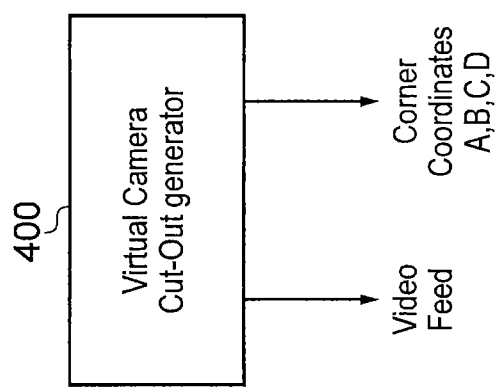
FIG. 4 shows a virtual camera cut-out generator according to embodiments.

FIG. 4 shows a virtual camera cut-out generator 400 for generating the perspective corrected zoomed-in image 200 from the original captured image 100. The zoomed-in image 200 is output by the cut-out generator 400 as a video feed. The cut-out generator 400 is as disclosed in Reference 1. Additionally, generator outputs the coordinate positions ($x_A$, $y_A$), ($x_B$, $y_B$), ($x_C$, $y_C$) and ($x_D$, $y_D$) of the corner points A, B, C and D (these may also be referred to simply as the corner coordinates). The cut-out generator 400 is able to do this because the 2D coordinate system that is applied to the image 100 by the telestrator is also applied to the image 100 by the cut-out generator. In other words, the 2D coordinate system implemented on the image 100 is synchronised between the cut-out generator 400 and the telestrator.

Figure 5:
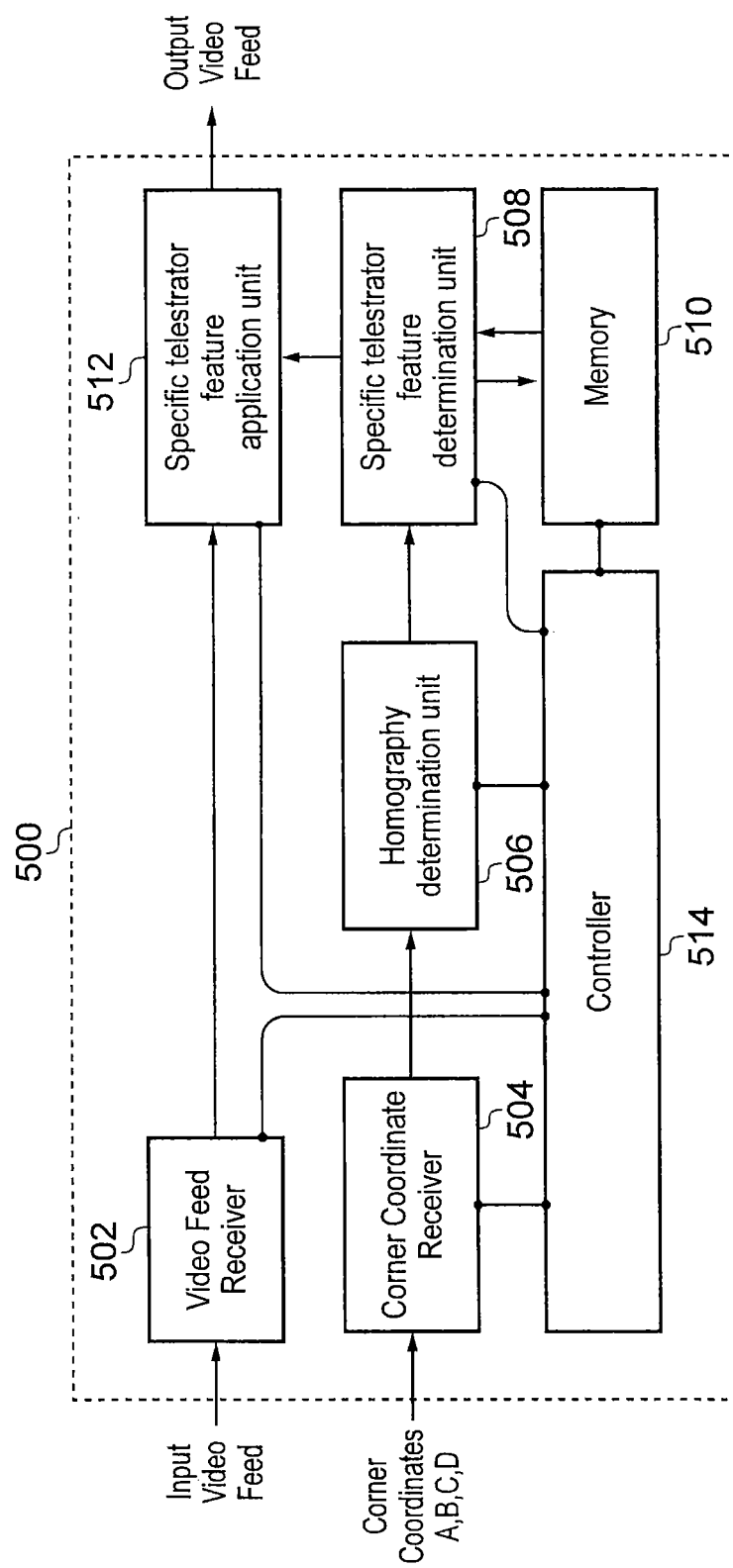
FIG. 5 shows a telestrator according to embodiments.

FIG. 5 shows a telestrator 500 according to embodiments. The telestrator 500 comprises a video feed receiver 502 for receiving the video feed from the virtual camera cut-out generator 400. So, the zoomed-in image 200 is received by the video feed receiver 502. The telestrator also comprises a corner coordinate receiver 504. The corner coordinate receiver receives the corner coordinates of the corners A, B, C and D of the cut-out 105. It will be appreciated that, in embodiments, the video feed receiver 502 and corner coordinate receiver 504 could be comprised within a single receiver rather than as two separate receivers, as shown in FIG. 5.

When a zoomed-in image 200 and corresponding set of corner coordinates are received, the corner coordinates are passed to a homography determination unit 506. The homography determination unit 506 determines, from the corner coordinates for the cut-out corners A, B, C and D, a homography between the set of 2D coordinate points of the original image 100 defined within the cut-out 105 and the set of 2D coordinate points defined in the different 2D coordinate system defined for the zoomed-in image 200. The 2D coordinate system defined for the zoomed-in image 200 may be used to define pixel positions of the zoomed-in image 200.

The homography between the 2D cut-out coordinates and the 2D zoomed-in image coordinates is based on matching the corner coordinates A, B, C, D with the coordinates defining the corners of the zoomed-in image 200 in the 2D coordinate system of the zoomed-in image 200. Thus, for example, if the zoomed-in image 200 is a Full HD image and the zoomed-in image coordinate system, correspondingly, extends from 0 to 1920 in the x-direction and 0 to 1080 in the y direction, a homography will be established such that corner point A is matched with point (0, 1080), point B is matched with point (1920, 1080), point C is matched with point (1920, 0) and point D is matched with point (0, 0). Any suitable homography may be used. For example, a least-squares error minimisation method may be used in order to find the parameters of the homography which map the four corners A, B, C, D to the corners of the zoomed-image 200. Methods of homography are well known in the art, and are therefore not discussed in detail here.

The homography established between the 2D coordinates within the cut-out 105 and the 2D coordinates of the zoomed-in image 200 are then passed to a specific telestrator feature determination unit 508. Here, based on the homography and based on the correspondence between the 3D coordinates of the scene and the 2D coordinates of the original image 100 (as determined by the camera matrix) telestrator features specific to the zoomed-in image 200 are determined. This is possible since telestrator features, which are defined as graphical features in the 3D coordinate system of the scene so as to form a virtual 3D map of the scene, can now be directly associated with the 2D coordinate system of the zoomed-in image 200. This, in turn, allows the telestrator features to be directly associated with pixels in the zoomed-in image 200. The virtual 3D map of the scene and the camera matrix are obtained from the memory 510 by the specific telestrator feature determination unit 508. As will be described later, the determination of the virtual 3D map of the scene and the camera matrix is carried out as part of the calibration process of the telestrator.

Figure 6:
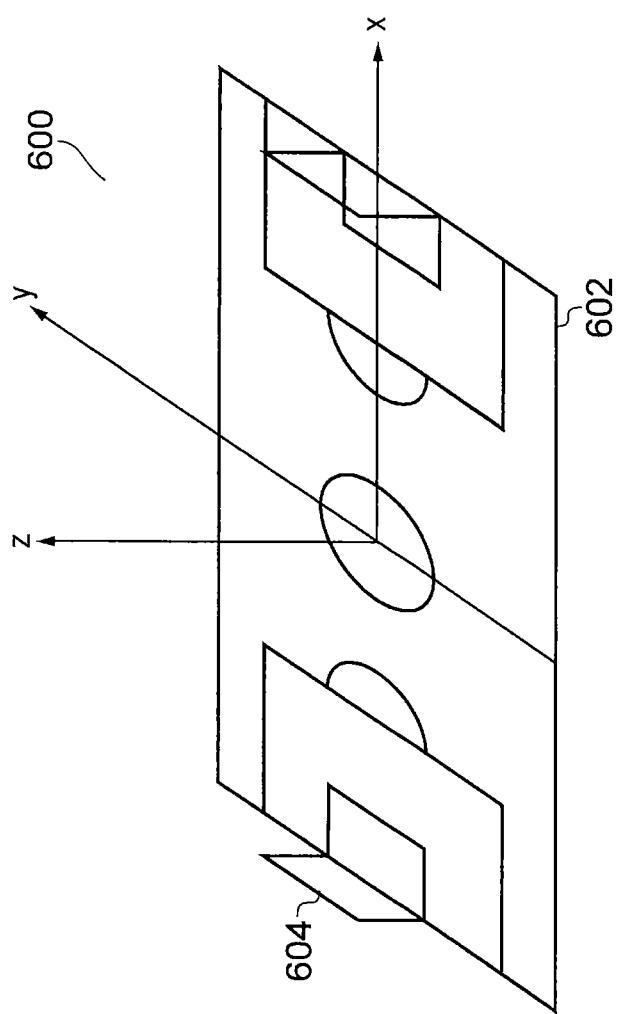
FIG. 6 shows a virtual 3D map of a scene.

As already mentioned, the virtual 3D map of the scene comprises virtual graphics in the 3D coordinate system of the scene. These graphics may represent the scene which has been captured in the original image 100. An example of this is illustrated in FIG. 6, in which a virtual 3D map 600 of the scene captured in the image 100 has been produced. It can be seen that this map comprises virtual pitch lines 602 of the soccer pitch. In this example, the virtual pitch lines 602 define the soccer pitch as being co-planar with the x-y plane. The map also includes virtual lines 604 which define the shape of the goals of the soccer pitch.

Once the specific telestrator features have been determined for the zoomed-in image 200 by the specific telestrator determination unit 508, the specific telestrator features are transformed as appropriate (firstly, from the 3D coordinate system of the scene to the 2D coordinate system of the original image 100 using the camera matrix, and secondly, from the 2D coordinate system of the original image 100 to the 2D coordinate system of the zoomed-in image 200 using the corner-matched homography) and superimposed onto the zoomed-in image 200 (as received from the video feed receiver 502) by the specific telestrator application unit 512. In others words, the specific telestrator features are applied to the zoomed-in image 200.

Figure 7:
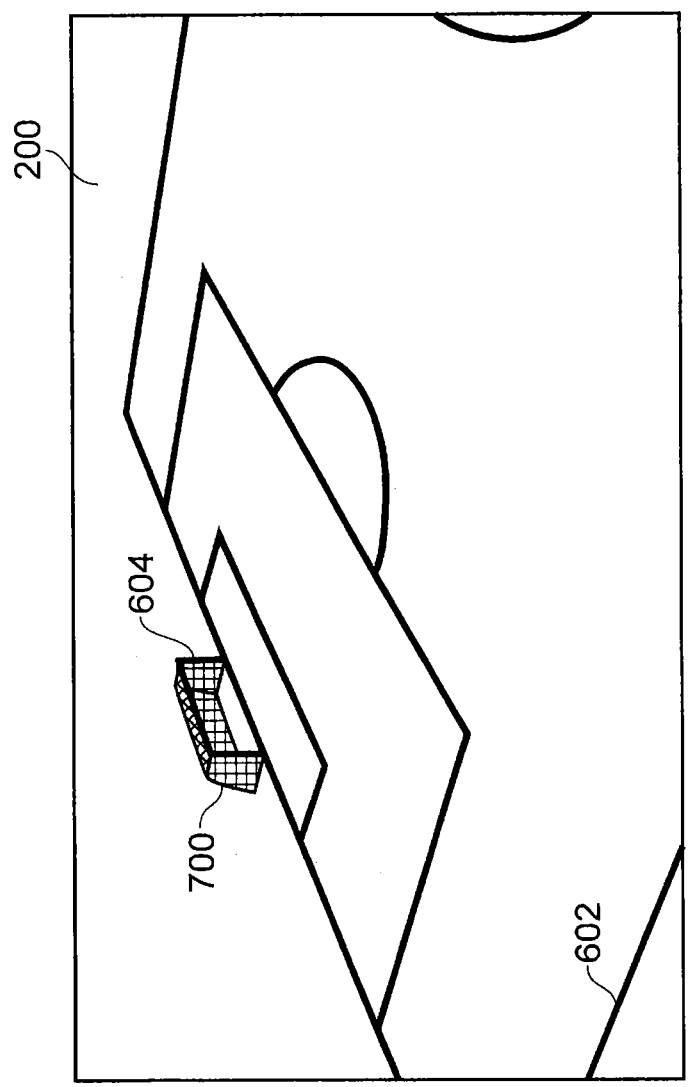
FIG. 7 shows the zoomed-in image with telestrator features applied.

This is illustrated in FIG. 7, in which the virtual pitch lines 602 of the soccer pitch and the virtual lines 604 defining the goals of the soccer pitch which are relevant to the zoomed-in image 200 have been superimposed onto the zoomed-in image 200. The virtual lines 602, 604 can be seen as lines which are thicker than the real pitch lines captured in the zoomed-in image 200 (see FIG. 2). It is noted that, since no virtual representation of the net 700 of the goal in the zoomed-in image 200 is present in the virtual 3D map 600, no virtual representation of the net 700 has been superimposed on the zoomed-in image 200.

The processed zoomed-in image 200 (that is, the zoomed-in image 200 which has been superimposed with the relevant virtual graphical features) is then output as part of an output video feed by the specific telestrator feature application unit 512.

The operation of the telestrator is controlled by the controller 514.

It will be appreciated that the virtual 3D map can include any suitable virtual graphical features which an operator may want to superimpose as a specific telestrator features on a zoomed-in image 200. For example, the virtual 3D map could include team logos, features of the stadium surrounding the pitch, the positions of particular players during a soccer game, the position of the ball during a soccer game, etc. Once these features have been established on the virtual 3D map, then they can be transformed and superimposed on the zoomed-in image 200 using the camera. In embodiments, the virtual 3D map can be updated in real time so that features such as the positions of particular players and the position of the ball are up to date prior to relevant graphics being superimposed onto a zoomed-in image 200.

Advantageously, embodiments of the present disclosure allow zoomed-in images 200 generated from the virtual camera cut-out generator 400 to be used with the telestrator 500 without the specific parameters used by the virtual camera cut-out generator 400 having to be processed by the telestrator. As disclosed in Reference 1, the specific parameters used by the generator 400 include the yaw, pitch, roll and zoom of the virtual camera which is specifically defined with respect to a predefined image plane, and these parameters are difficult for the telestrator 500 to use directly in determining which telestrator features from the virtual 3D map are relevant to a particular zoomed-in image 200. This results in the need for intensive processing of the specific parameters by the telestrator 500. On the other hand, in embodiments of the present disclosure, all that is required is that the generator 400 and telestrator 500 know the common 2D coordinate system of the image 100 and that the four corner coordinates of the cut-out 105 are transmitted to the telestrator 500. The four corner coordinates are much easier for the telestrator 500 to process, since the only necessary processing is the establishment of the homography between the 2D coordinates of the cut-out 105 and the 2D coordinates of the zoomed-in image 200. This is much less processor intensive.

Figure 8:
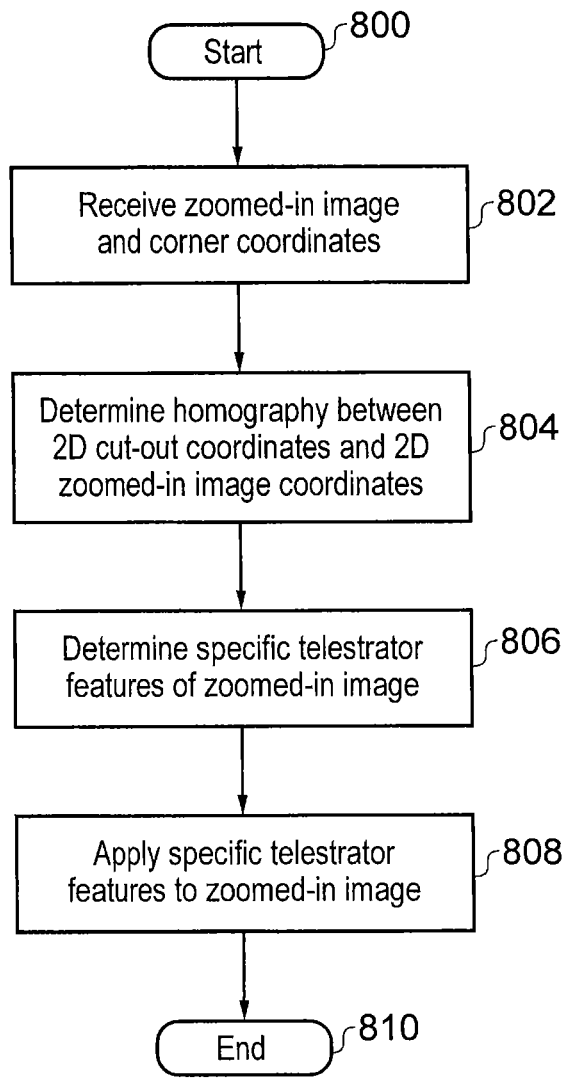
FIG. 8 shows a process for the operation of the telestrator.

FIG. 8 shows a flow chart describing the process by which a telestrator 500 applies specific telestrator features to a zoomed-in image 200, according to embodiments. The process starts at step 800. At step 802, the telestrator receives the zoomed-in image 200 and the corner coordinates of the cut-out 105 from which the zoomed-in image 200 is generated. At step 804, the corner coordinates are used to determine a homography between the 2D coordinates defined within the cut-out 105 and the 2D coordinates of the zoomed-in image 200. At step 806, the determined homography, together with the virtual 3D map of the scene and the camera matrix, are used to determine specific telestrator features of the zoomed-in image 200. Then, at step 808, the determined specific telestrator features are applied to the zoomed-in image 200. The process then ends at step 810.

Prior to a zoomed-in image 200 being processed by the telestrator 500, a zoomed-in image 200 must first be obtained by the telestrator in accordance with the wishes of the telestrator operator. In other words, the telestrator operator must be able to control the yaw, pitch, roll and focal length of the virtual camera in order to obtain the zoomed-in image 200 that they want. In embodiments, this is achieved by providing the means for the telestrator operator to choose a part of the scene that they wish the virtual camera to point at and to choose the focal length (or zoom level) of the virtual camera. Specifically, referring back to FIG. 3, the telestrator operator may choose a point P on the original image 100 of the scene, the point P indicating the part of the image 100 that the telestrator operator wishes the virtual camera to point at. The point P defines a point within the cut-out 105 from which the zoomed-in image 200 is generated. In this example, the point P represents the centre of the cut-out 105. The telestrator may also choose the zoom level of the virtual camera. The zoom level indicates the size of the cut-out 105. The point P and the zoom level of the virtual camera may be chosen by the telestrator using any suitable method.

Figure 9:
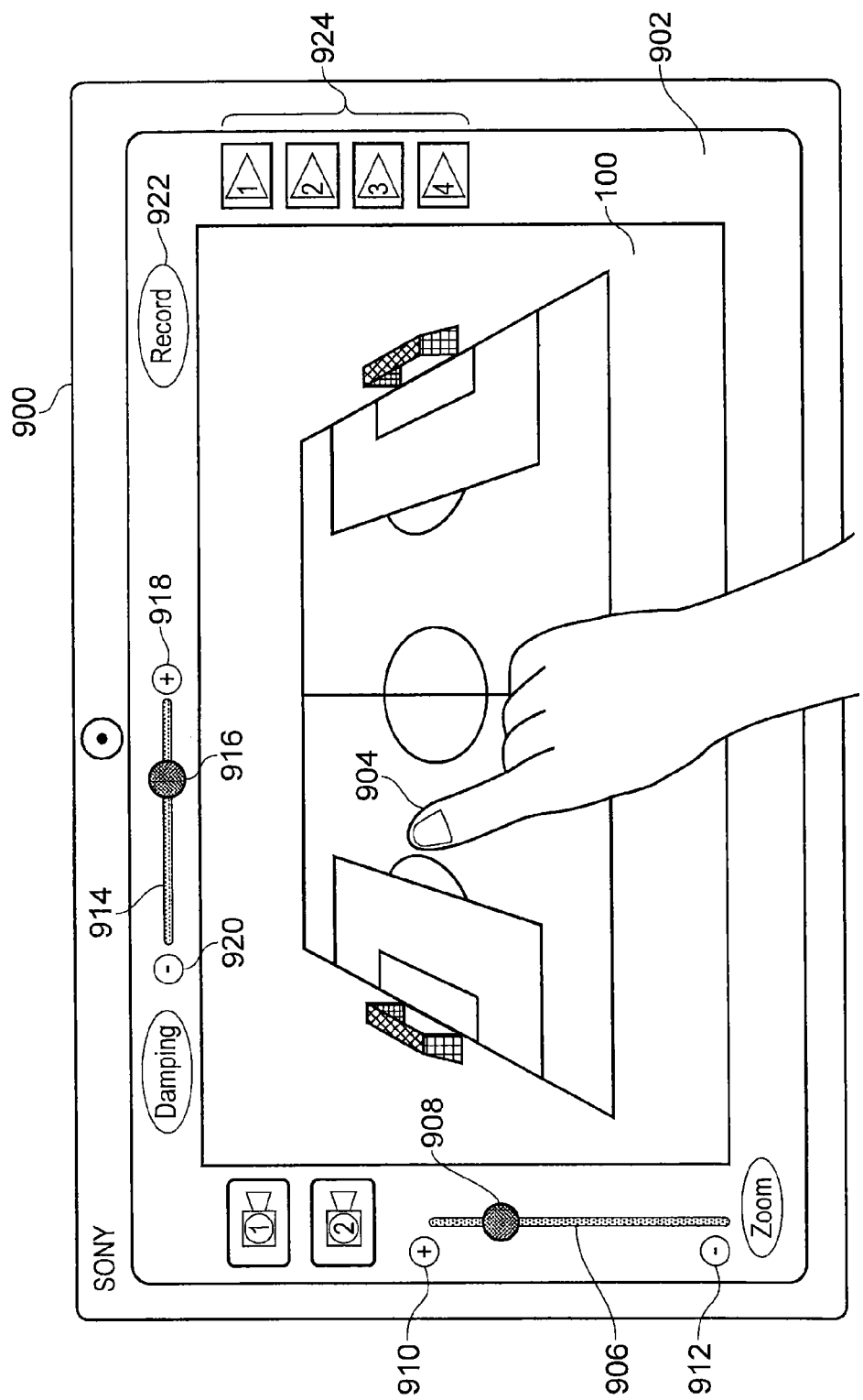
FIG. 9 shows a method for controlling the generation of the zoomed-in image.

FIG. 9 illustrates a way in which the point P and the zoom level can be determined by the telestrator operator, according to embodiments. Here, a touch screen tablet computer 900 (also referred to simply as tablet) is used to display the image 100 to the operator. An example of a tablet 900 is the Sony Xperia 8 Tablet Z. The tablet 900 has a data connection with the telestrator 500 and/or virtual camera cut-out generator 400. This data connection may be any suitable wired or wireless connection (for example, a Wi-Fi or wireless mobile connection).

The image 100 is displayed on the screen 902 of the tablet. In order to select a point P, the operator simply touches the screen 902 at a desired point on the image with their finger 904. The tablet 900 then processes this input and determines the position of the point P, given by $(x_P, y_P)$, on the 2D coordinate system defined over the image (as described with reference to FIG. 3).

The operator can also determine the zoom of the virtual camera using the slide bar 906. Specifically, the user moves the position of the slider marker 908 towards the plus marker 910 in order to zoom in (increasing the focal length of the virtual camera and making the cut-out 105 smaller) and towards the minus marker 912 in order to zoom out (decreasing the focal length of the virtual camera and making the cut-out larger).

The selected position P and virtual camera zoom are then transmitted to the virtual camera cut-out generator 400. Here, the cut-out generator 400 determines the yaw, pitch and roll of the virtual camera and computes, from these values and the zoom level, the corner coordinates for the corners A, B, C and D of the cut-out 105. The zoomed-in image 200 and corner coordinates are then output by the cut-out generator 400 to the telestrator in the way as previously described. The yaw, pitch and roll of the virtual camera are determined from the point P using any suitable method.

For example, in embodiments, when the user selects a point P, the coordinates of the point P may be determined as:

$$P = \begin{bmatrix} P_x \\ P_y \\ -\text{image focal length} \end{bmatrix}$$

The image focal length is the focal length at which the original image 100 was captured, and is defined here in units such that a field of view of 90 degrees corresponds to a focal length of 1.

The pitch $\phi_V$ of the virtual camera is then given by:

$$\varphi_V = \arctan\left(-\frac{P_y}{\text{image focal length}}\right)$$

This can then be used to calculate a virtual camera pitch matrix:

$$P_V = \begin{bmatrix} 1 & 0 & 0 \\ 0 & \cos\varphi_V & \sin\varphi_V \\ 0 & -\sin\varphi_V & \cos\varphi_V \end{bmatrix}$$

The coordinates P defined for point P are then transformed by the pitch matrix to give P':

$$P' = P_V * P$$

From the x coordinate of P', the yaw $\theta_V$ of the virtual camera may be calculated:

$$\theta_V = \arctan\left(\frac{P'_x}{\text{image focal length}}\right)$$

The roll can then be set using the roll equation previously defined in Reference 1. That is, the roll $\rho_V$ of the virtual camera may be calculated using the equation:

$$\rho_V = \sin^{-1}(\sin(\theta_V) * \sin(\phi_V + \phi_{rig})) + \rho_{rig}$$

wherein $\phi_{rig}$ defines an angle of pitch of the camera capturing the scene about a predetermined camera pitch axis and $\rho_{rig}$ defines an angle of roll of the camera capturing the scene about a predetermined camera roll axis, the predetermined first camera pitch and roll axes defining a horizontal plane in the scene (again, see Reference 1).

Thus, each of the virtual camera yaw, pitch and roll can be determined from the point P. When the zoom level of the virtual camera is also received, the cut-out generator 400 is thus able to generated the cut-out 105 and output the corresponding zoomed-in image 200 and corner coordinates to the telestrator 500.

In embodiments, the image 100 may be transformed before being displayed to the user so as to improve the visual characteristics of the image and thus make it easier for the user to select an appropriate point P. For example, a transformed image generated from a specifically chosen cut-out of the image 100 may be displayed to the user, the specifically chosen cut-out serving to frame the soccer pitch nicely on the screen 902 of the tablet 900. In this case, the cut-out will have been generated from a specific virtual camera rotation matrix $V_{reference}$. Before the selected coordinates of the chosen point P can be processed as described, this transformation first needs to be undone. This is achieved by obtaining an intermediate value from the coordinates P via the equation:

$$P_{intermediate} = V_{reference} * P$$

The x and y values of $P_{intermediate}$ are then recomputed as follows:

$$P_{intermediate_x} = \frac{P_{intermediate_x}}{P_{intermediate_z}} * -\text{image focal length}$$

$$P_{intermediate_y} = \frac{P_{intermediate_y}}{P_{intermediate_z}} * -\text{image focal length}$$

The values of $P_{intermediate_x}$ and $P_{intermediate_y}$ are then used in place of the values of $P_x$ and $P_y$ in the above equations.

In embodiments, as the telestrator operator changes the position of the point P and/or the zoom of the virtual camera, the latest position of the point P and/or zoom of the virtual camera is transmitted to the cut-out generator 400 which, in turn, outputs a zoomed-in image 200 and the corner coordinates of the cut-out 105 used to generated that zoomed-in image 200. The cut-out generator 400 may output a zoomed-in image 200 and corner coordinates at any suitable predetermined frame rate, for example, a rate of 24, 50, 60, 100 or 200 Hz. Each zoomed-in image 200 is then processed by the telestrator 500 in the way as previously described so as to apply specific telestrator features to the zoomed-in image 200. The processed zoomed-in image 200 may then be shown on a display (not shown). In embodiments, each zoomed-in image 200 generated by the cut-out generator 400 may be processed and displayed to the operator in real time. Advantageously, this allows the operator to obtain real time feedback on the virtual camera view generated from their choice of P and the virtual camera zoom level.

In embodiments, when a new position of the point P is selected by the operator, the yaw, pitch and roll of the virtual camera may be changed gradually from the current yaw, pitch and roll to a target yaw, pitch and roll determined by the newly selected point P. This gradual change is possible via the use of a damping coefficient, as described in Reference 1, and gives the illusion that the zoomed-in image 200, which is generated from the field of view of a virtual camera, is actually generated from a real camera which is panned across the scene. Advantageously, this makes for more comfortable viewing of the zoomed-in image 200 for a user.

In embodiments, as the yaw, pitch and roll of the virtual camera is gradually changed, intermediate zoomed-in images 200 and corner coordinates may be generated by the cut-out generator 400 and output to the telestrator 500 and processed at the predetermined frame rate. This allows intermediate zoomed-in images 200 with specific telestrator features applied to them to be displayed as the yaw, pitch and roll of the virtual camera is gradually changed. Once the yaw, pitch and roll corresponding to the point P has been reached, then the virtual camera will stay with this same yaw, pitch and roll until a new point P is determined. On the other hand, if, during the gradual change of the virtual camera yaw, pitch and roll to the selected point P, a new point P is chosen, then the target yaw, pitch and roll will be changed to those corresponding to the new point P and the yaw, pitch and roll of the virtual camera will be gradually changed towards these new target values.

In embodiments, the telestrator operator may want to increase or reduce the amount of time taken for the yaw, pitch and roll of the virtual camera to reach the values determined by a newly chosen point P. In other words, the operator may wish to change the damping coefficient implemented by the virtual camera cut-out generator 400. This can be achieved in any suitable way which allows a new damping coefficient to be communicated to the cut-out generator 400. As an example, in FIG. 9, it can be seen that the interface of the tablet 900 includes a damping slide bar 914. This allows the operator to determine the level of damping that is required in real time. In order to increase the damping coefficient (thus increasing the time it takes for virtual camera to reach the target yaw, pitch and roll determined by P), the operator moves the position of the slider marker 916 towards the plus marker 918. On the other hand, in order to decrease the damping coefficient (thus decreasing the time it takes for the virtual camera to reach the target yaw, pitch and roll determined by the point P), the operator moves the position of the slider marker 196 towards the minus marker 920.

Thus, in embodiments, the operator advantageously has excellent control capabilities over the position of the virtual camera. Specifically, the operator can easily determine a suitable yaw, pitch and roll of the virtual camera, a suitable focal length of the virtual camera and a suitable damping coefficient for the virtual camera.

In the embodiments described so far, the image 100 displayed on the tablet 900 is a live video image of the scene captured by the real camera. This may be output by the virtual camera cut-out generator 400 and transmitted to the tablet. Alternatively, a simplified, still image of the lines of the pitch in the 2D coordinate system of the original image 100 may be used with the tablet 900 instead. Advantageously, this still allows the user to accurately choose the position of the point P, but reduces the amount of bandwidth used when compared to transmitting the live video image 100 to the tablet 900.

Figure 10:
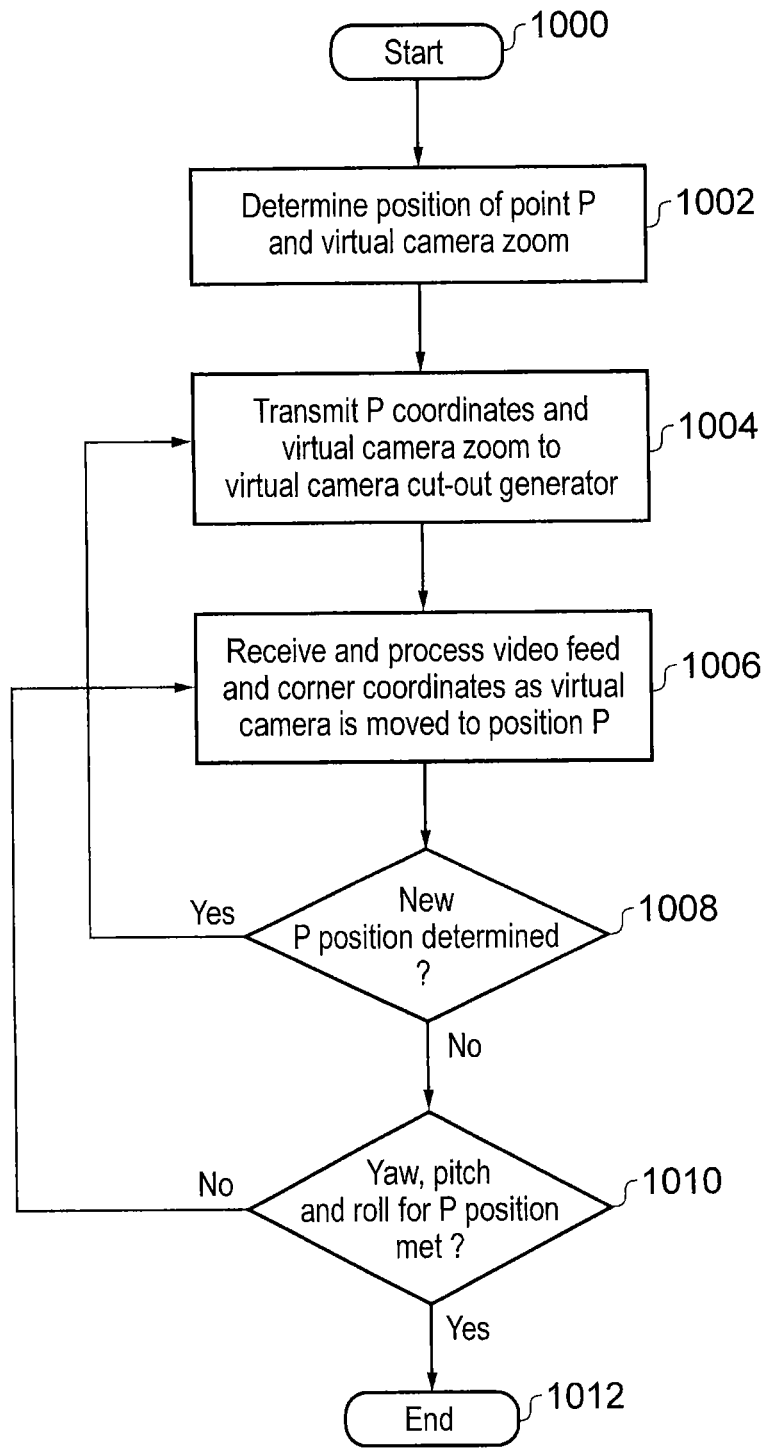
FIG. 10 shows a process in which the yaw, pitch, roll and zoom of a virtual camera for generating the zoomed-in image are gradually changed.

FIG. 10 shows a flow chart which illustrates the process by which the yaw, pitch and roll of the virtual camera are determined by the telestrator operator. The process starts at step 1000. At step 1002, the position of the point P in the 2D coordinate system defined for the originally captured image 100 is determined. At step 1004, the coordinates of the point P and are transmitted to the virtual camera cut-out generator 400. At step 1006, the cut-out generator gradually changes the yaw, pitch and roll of the virtual camera to the target yaw, pitch and roll determined by the point P. As the yaw, pitch and roll is gradually changed, the telestrator receives and processes a video feed of intermediate new zoomed-in images 200 and corner coordinates transmitted by the cut-out generator at the predetermined frame rate.

At step 1008, it is determined as to whether or not a new position of the point P has been determined. If a new position of point P has been determined, then the process goes back to step 1004, in which the coordinates of the new P position are transmitted to the virtual camera cut-out generator 400. On the other hand, if no new point P has been determined, then the process moves to step 1010.

At step 1010, it is determined as to whether or not the yaw, pitch and roll of the virtual camera corresponding to the point P have been reached. If they have been reached, then the process ends at step 1012. On the other hand, if they have not been reached, then the process moves back to step 1006, in which the yaw, pitch and roll of the virtual camera continue to be gradually changed.

In the flow chart of FIG. 10, the focal length (zoom) of the virtual camera is not specifically mentioned. However, it will be appreciated that the focal length of the virtual camera may be regularly changed by the operator (using, for example, the slide bar 906). Thus, in embodiments, any update to the focal length of the virtual camera is transmitted to the virtual camera cut-out generator 400 so as to allow the zoomed-in image 200 and corner coordinates to be updated accordingly.

Also, in embodiments, like changes to the position of the point P, any changes to the virtual camera zoom may also be subject to damping via the damping coefficient. Advantageously, this makes a change in focal length of the virtual camera (and hence the level of zoom of the zoomed-in image 200) appear more natural and comfortable to the user. In this case, a change to the focal length of the virtual camera will be applied gradually until a target focal length value is met.

The telestrator operator may want to record a certain virtual camera motion sequence so that the same sequence can be used multiple times. For example, when using the virtual camera to capture zoomed-in images of a soccer game, the operator may wish to have one or more predetermined virtual camera motion sequences, such as a slow panning and zooming out shot from one of the goals of the soccer pitch to a wide angle view of the entire scene, for example. Embodiments of the present disclosure provide a way in which the recording and playback of virtual camera motion sequences is enabled.

Figure 11:
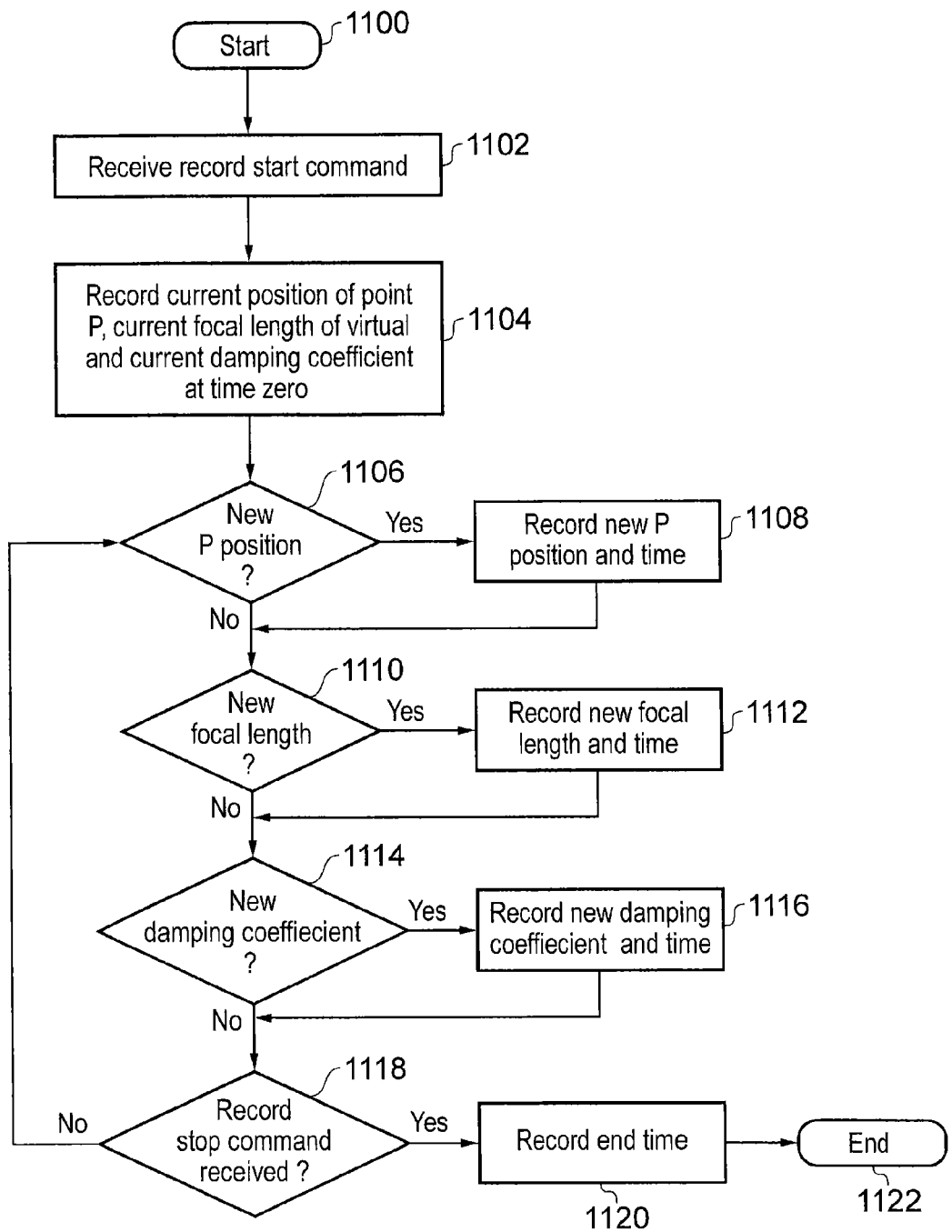
FIG. 11 shows a process in which a motion sequence of the virtual camera is recorded.

FIG. 11 shows a flow chart which illustrates the process by which a virtual camera motion sequence is recorded, according to embodiments. The process starts at step 1100. At step 1102, a command to start recording of a virtual camera motion sequence is received. In embodiments, this may be issued by the telestrator operator touching the on-screen record button 922 of the tablet 900, as illustrated in FIG. 9. Once the command to start recording has been issued, the current position of point P, current focal length of the virtual camera and current damping coefficient are recorded as being the point P position, focal length and damping coefficient values at time zero of the recording. In this case, if the yaw, pitch, roll and/or focal length of the virtual camera are still being gradually changed so as to meet target values established by a selected position of P and focal length, then the virtual camera cut-out generator 400 may temporarily ignore the damping coefficient and establish the target yaw, pitch, roll and focal length for the virtual camera so that the recording process can start.

The process then moves on to step 1106. Here, it is determined as to whether or not a new position of P has been selected by the operator. If a new position of P has been selected, then the process moves to step 1108, where the new position of P and the time at which the new position of P was selected is recorded. The process then moves onto step 1110. If, on the other hand, a new position of P has not been selected, then the process moves directly to step 1110.

At step 1110, it is determined as to whether or not a new focal length of the virtual camera has been selected by the user. If a new focal length has been selected, then the process moves to step 1112, where the new focal length and the time at which the new focal length was selected is recorded. The process then moves onto step 1114. If, on the other hand, a new focal length has not been selected, then the process moves directly to step 1114.

At step 1114, it is determined as to whether or not a new damping coefficient has been selected by the user. If a new damping coefficient has been selected, then the process moves to step 1116, where the new damping coefficient and the time at which the new damping coefficient was selected is recorded. The process then moves onto step 1118. If, on the other hand, a new damping coefficient has not been selected, then the process moves directly to step 1118.

At step 1118, it is decided as to whether or not a record stop command has been received. In embodiments, a record stop command may be issued by the operator touching the on-screen record button 922 for a second time. If a record stop command has not been received, then the process returns to step 1106. On the other hand, if a record stop command has been received, then the process moves onto step 1120, in which the time at which the record stop command was received is recorded. The process then ends at step 1122.

Once the recording of the virtual camera motion sequence has ended, the sequence is electronically stored in any suitable form. For example, the sequence may be stored in a table 1200, as illustrated in FIG. 12. Here, four separate times can be seen. It is noted that, in embodiments, the sequence may be stored a storage medium (not shown) associated with the tablet 900.

The first time is time zero, that is, the time at which the recording is defined to have begun following the issue of the record start command by the user. Here, the P position, virtual camera focal length and damping coefficient which were selected by the user at the time at which the record start command was issued are recorded. It is noted that, although the virtual camera focal length is given in mm, this is for ease of understanding. In reality, the focal length may be given in units in which a focal length of 1 corresponds to a field of view of 90 degrees, as explained above.

The second time is 3 seconds and 12 hundredths of a second from the time at which the record start command was issued. This second time has been recorded since the user has simultaneously determined both a new P position and a new focal length. Thus, the new time, together with the new P position and focal length, is recorded.

The third time is 5 seconds and 56 hundredths of a second from the time at which the record start command was issued. Again, this third time has been recorded since the user has simultaneously determined both a new P position and a new focal length.

The fourth time is 7 seconds and 28 hundredths of a second from the time at which the record start command was issued. Here, although the P position has not changed, this fourth time has been recorded since the user has simultaneously determined both a new focal length and a new damping coefficient.

Finally, at a fifth time of 10 seconds and 14 hundredths of a second from the time at which the record start command was issued, a record stop command is issued by the user. Thus, a marker identifier the end of the virtual camera motion sequence is recorded for each of the P position, virtual camera focal length and damping coefficient. This indicates that the recording of the virtual camera motion sequence is complete.

In embodiments, when the user wishes to use the recorded virtual camera motion sequence, they select the recorded sequence 1200 from the storage medium associated with the tablet 900 using a suitable on-screen interface of the tablet 900. Any suitable on-screen interface could be used. For the tablet shown in FIG. 9, it can be seen that four on-screen sequence shortcut buttons 924 are provided. Each of these will be associated with a pre-recorded virtual camera motion sequence. A user may therefore select one of four pre-recorded virtual camera motion sequences by choosing the appropriate sequence shortcut button 924.

Once a pre-recorded virtual camera motion sequence 1200 has been selected, the sequence 1200 is transmitted to the virtual camera cut-out generator 400. Although it is not shown, the virtual camera cut-out generator 400 comprises a storage medium in which the received motion sequence table 1200 is stored. Furthermore, the virtual camera cut-out generator 400 comprises a motion sequence control unit (also not shown), which controls the cut-out generator 400 to sequentially output zoomed-in images 200 and corner coordinates in accordance the P position, virtual camera focal length and damping coefficient at each time value recorded in the motion sequence 1200. In other words, a new P position, virtual camera focal length and damping coefficient in the sequence 1200 is only made available to the virtual camera cut-out generator 400 by the motion sequence control unit once the time recorded for that new P position, virtual camera focal length and damping coefficient has elapsed.

Thus, in embodiments, when a pre-recorded virtual camera motion sequence 1200 is selected by the user, the motion sequence 1200 is transmitted to the virtual camera cut-out generator 400, which then outputs zoomed-in images 200 and corner coordinates to the telestrator 500 in accordance with the timings of the motion sequence.

For example, if the motion sequence 1200 in FIG. 12 is selected by the user and transmitted to the virtual camera cut-out generator 400, then, initially, the cut-out generator 400 outputs a zoomed-in image 200 and corner coordinates according to the P position and focal length recorded at time zero in the table 1200.

Then, after 3 seconds and 12 hundredths of a second, the target P position and focal length of the virtual cut-out generator 400 are changed to the P position and focal length recorded for this time in the table 1200. The cut-out generator 400 therefore gradually changes the yaw, pitch, roll and zoom of the virtual camera in accordance with the target P position and focal length, outputting zoomed-in images 200 and corner coordinates to the telestrator 500 at the predetermined frame rate during this gradual change. The rate of the gradual change is determined by the damping coefficient specified for this time.

This is repeated for the further timings in the motion sequence 1200. That is, each time the motion sequence control unit deems the next recorded time in motion sequence 1200 to have elapsed, the target P position, focal length and damping coefficient of the virtual camera cut-out generator 400 are updated, and zoomed-in images and corner coordinates are provided to the telestrator 500 at the predetermined frame rate as the virtual camera yaw, pitch, roll and zoom are gradually changed in accordance with the target P position, focal length and damping coefficient. This continues until the stop time has elapsed (in the example of FIG. 12, the stop time being 10 seconds and 14 hundredths of a second), at which point, the current yaw, pitch, roll and zoom of the virtual camera are maintained. The current yaw, pitch, roll and zoom of the virtual camera will be maintained until further input from the telestrator operator is received.

It can be seen that the result of the virtual camera motion sequence shown in FIG. 12 is that the virtual camera gradually pans from the left hand side of the soccer pitch to the centre of the pitch, whilst, at the same time, gradually zooming out from a telephoto view (long focal length) to a wide angle view (short focal length). The damping coefficient is also increased at the final time record prior to the end time (that is, at 7 seconds and 28 hundredths of a second), meaning that the gradual zooming out of the virtual camera slows towards the end of the sequence (note that, for the two final time records prior to the end time, the target central P position does not change, rather, it is only the zoom which changes).

Thus, advantageously, in embodiments, an interface is provided which allows the user to quickly and conveniently record and re-use motion sequences of the virtual camera. It is noted that the utilisation of the motion sequence data 1200 by the motion sequence control unit of the virtual camera cut-out generator 400 effectively provides updated values of the position P, focal length and damping coefficient to the virtual camera cut-out generator 400, as discussed with reference to FIG. 10 (in particular, step 1008), automatically at predetermined time intervals.

In embodiments, more than one virtual camera may be used to simultaneously generate more than one cut-out 105 of the original image 200. This allows a plurality of independent zoomed-in images 200 to be generated simultaneously. Each of the zoomed-in images 200 may be generated with a different yaw, pitch, roll and/or zoom of the virtual camera, thus allowing different areas of the scene to be captured within different zoomed-in images 200. Each of the different zoomed-in images 200 can then be processed by the telestrator in the way as previously described. Advantageously, this gives the option to the user to use multiple images of the scene with telestrator features applied to each of these images, adding production value to the captured video footage.

Figure 13:
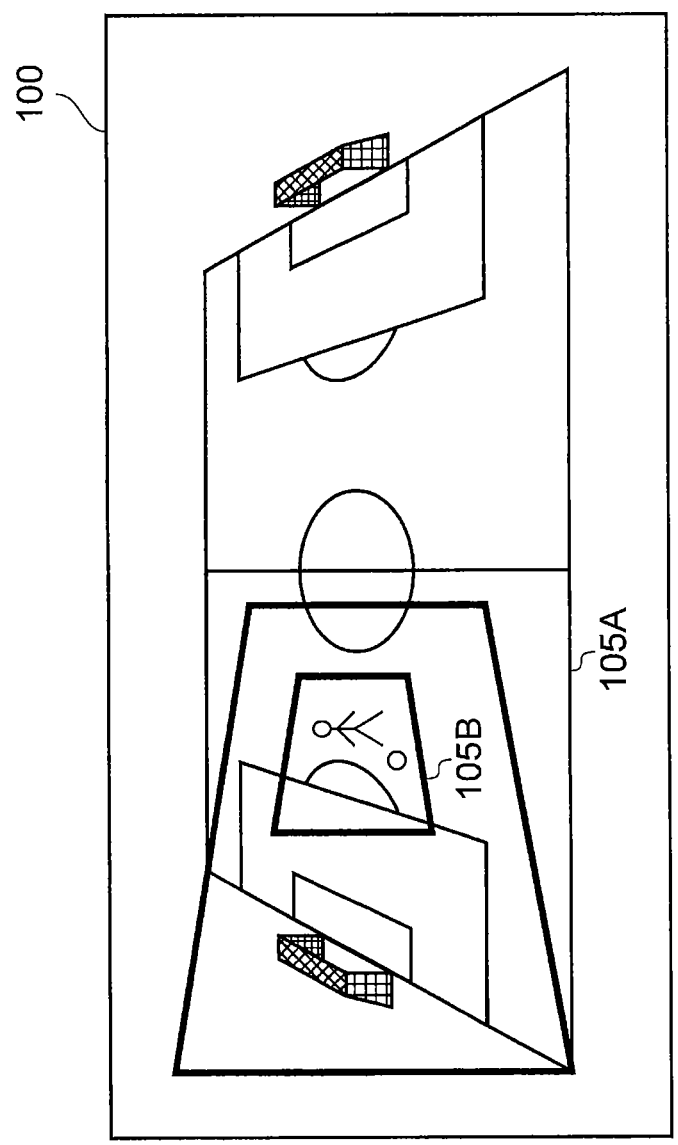
FIG. 13 shows an arrangement in which a plurality of cut-outs of the original image is generated.

An example of the way in which multiple virtual cameras can be used is given in FIG. 13. Here, it can be seen that a first cut-out 105A of the original image 100 has been created via the use of a first virtual camera with a first yaw, pitch, roll and zoom. Furthermore, a second cut-out 105B of the original image 100 has been created via the use of a second virtual camera with a second yaw, pitch, roll and zoom. It can be seen that, due to the second virtual camera having a higher zoom than the first virtual camera, the second cut-out 105B is smaller than the first cut-out 105A. It can also be seen that the yaw, pitch and roll of the second camera has been chosen with respect to yaw, pitch and roll of the first camera so that the second cut-out 105B is inside the first cut-out 105A.

The result of this arrangement is that two separate zoomed-in images 200 of the same area of the scene have been captured, with one image (that is, the zoomed-in image 200 generated from the second cut-out 105B) being more zoomed-in than the other (that is, the zoomed-in image 200 generated from the first cut-out 105A). The two images can then be used in combination to add production value to the captured footage. An example of this is given in FIG. 14. Here, it can be seen that the second zoomed-in image 200B generated from the second cut-out 105B has been superimposed on top of the first zoomed-in image 200A generated from the first cut-out 105A as a combined image. Specifically, the second zoomed-in image 200B provides a zoomed-in image of a player 1400 which is superimposed on a wider image of the soccer pitch provided by the first zoomed-in image 200A. An imaging effect 1405 of a magnifying glass surrounding the superimposed second zoomed-in image 200B is also shown, adding further production value to the image combination.

Figure 14:
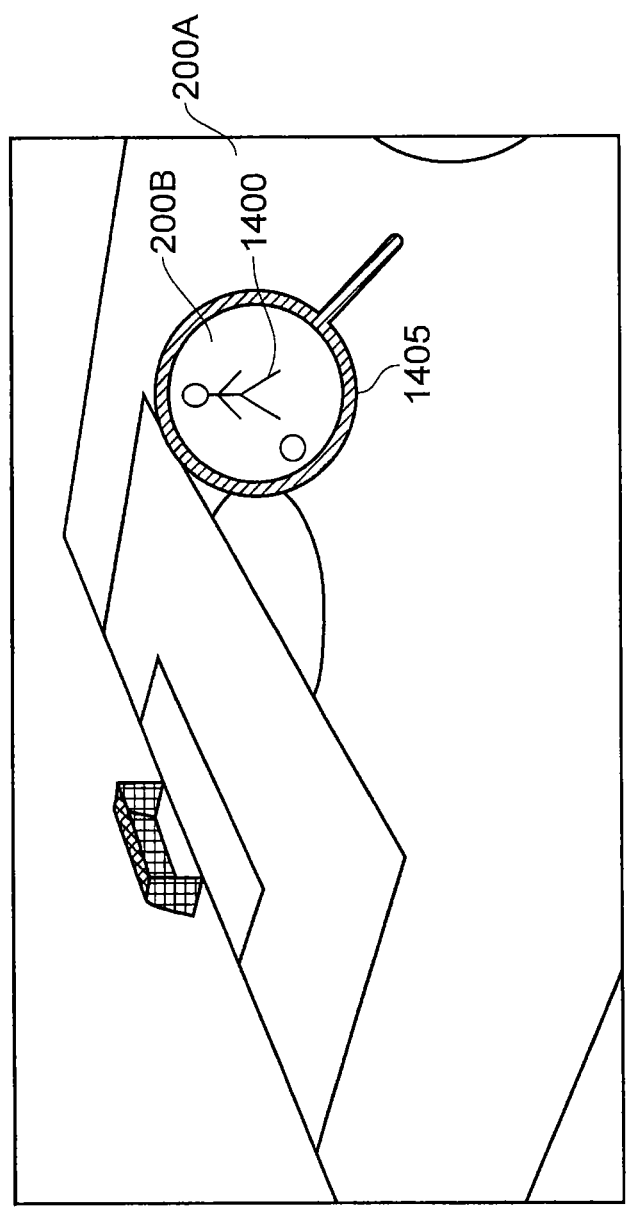
FIG. 14 shows an image generated from a plurality of zoomed-in images respectively generated from the plurality of cut-outs.
Figure 15:
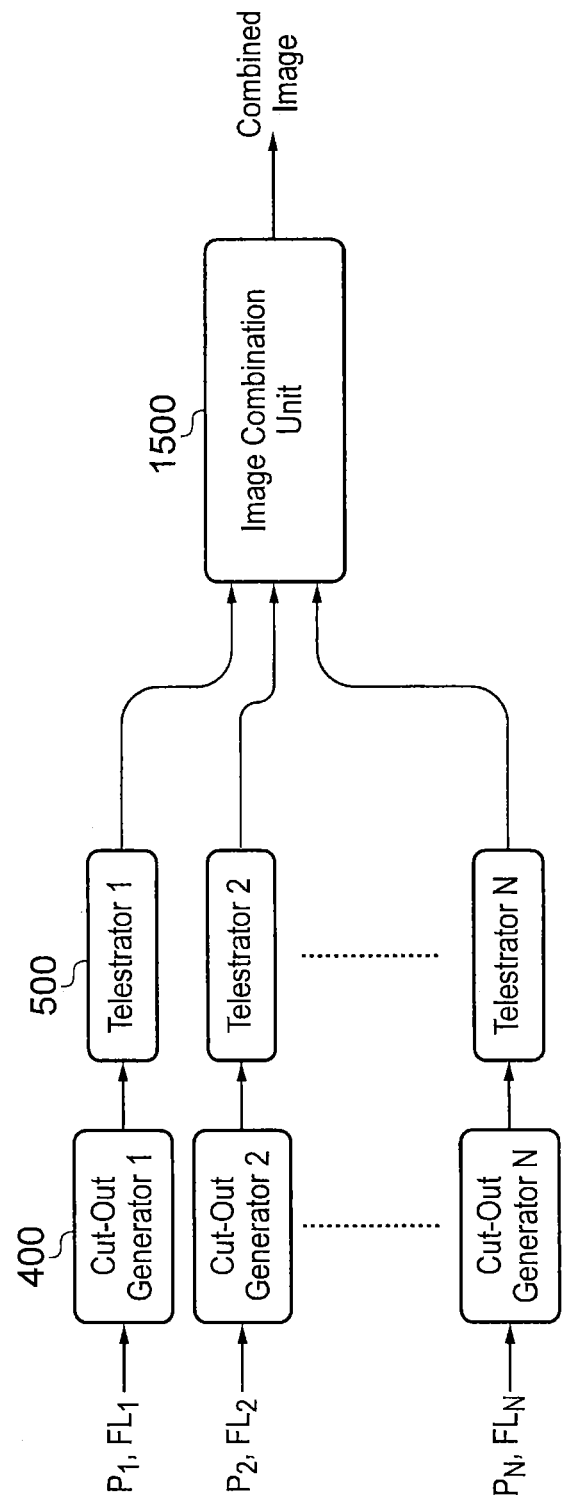
FIG. 15 shows an arrangement in which a plurality of virtual camera cut-out generators and telestrators are used in parallel with an image combination unit.

It is emphasised that the image combination shown in FIG. 14 is merely an example. In embodiments, any number of virtual camera cut-out generators 400 and telestrators 500 can be used in combination so as to create a corresponding number of zoomed-in images 200 which can be combined and manipulated in any way. A general system for producing such image combinations is illustrated in FIG. 15. Here, it can be seen that a position P and focal length FL are input into each of a plurality of cut-out generators 400. Each of the cut-out generators 400 then outputs a zoomed-in image 200 and corner coordinates to a respective telestrator 500. Each telestrator 500 then applies a specific telestrator feature to its respective image, if appropriate. The plurality of zoomed-in images 200, with telestrator features applied, are then fed to an image combination unit 1500. The image combination unit 1500 combines the zoomed-in images 200 in any suitable way as determined by the user and adds further imaging effects to the combined image as appropriate (for example, the magnifying glass imaging effect 1405 in FIG. 14 could be added by the image combination unit 1500). Finally, a combined image, with appropriate imaging effects applied, is output by the image combination unit 1500.

As already mentioned, in embodiments, in order to apply specific telestrator features to a received zoomed-in image 200, the telestrator transforms graphical features established in a 3D map of the scene and maps these graphical features as telestrator features to the pixels of the zoomed-in image 200. This is possible through the camera matrix, which defines a relationship between the 3D coordinate system of the scene and 2D coordinate system of the original image 200, and through the homography established between the 2D coordinates defined by a cut-out 105 of the original image 200 and the 2D coordinates of the zoomed-in image 200. The virtual 3D map of the scene and virtual camera matrix are determined during a calibration process of the telestrator.

Figure 16:
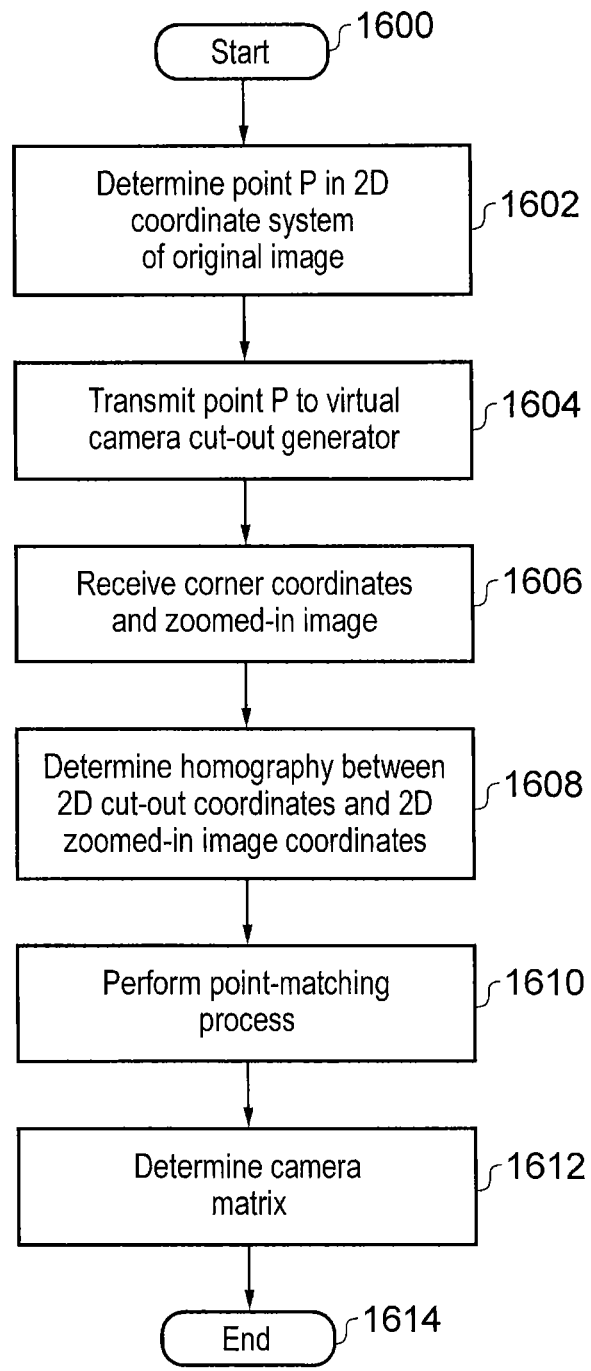
FIG. 16 shows a process for calibration of a camera matrix.

FIG. 16 shows a flow chart which illustrates the telestrator calibration process, according to embodiments.

The process starts at step 1600. At step 1602, a point P position is determined on the 2D coordinate system of the original captured image 100. Note that, in order for the calibration process to take place, the original image 100 must have been captured and the 2D coordinate system must have been applied to this image. Both the virtual camera cut-out generator 400 and the telestrator 500 are able to refer to the 2D coordinate system.

Once the point P position has been determined, the point P position is transmitted from the telestrator 500 to the virtual camera cut-out generator 400. Here, the cut-out generator 400 uses the P position to determine the yaw, pitch and roll of the virtual camera and uses the determined yaw, pitch and roll of the virtual camera to produce a zoomed-in image 200 and corner coordinates. The determination of the yaw, pitch and roll of the virtual camera from the P position and of the corner coordinates from the yaw, pitch and roll of the virtual camera is as earlier described. It is also noted that a zoom level of the virtual camera will also be generated with the point P position at step 1602 and transmitted to the cut-out generator 400 with the point P position at step 1604 so as to generate the zoomed-in image 200 and corner coordinates from a cut-out 105.

At step 1606, the telestrator 500 receives the zoomed-in image 200 and the corner coordinates. Then, in step 1608, the corner coordinates are used to determine a homography between the 2D coordinates defined by the cut-out and the 2D coordinates of the zoomed-in image.

Thus, so far, the telestrator knows the homography between the 2D coordinates of the cut-out 105 and the 2D coordinates of the zoomed-in image 200. However, as already mentioned, in order to be able to apply specific telestrator features to zoomed-in images 200 generated from the virtual camera, it is necessary for the telestrator 500 to be able to refer to a virtual 3D map of the scene (which will contain graphical features which may be transformed and superimposed onto the zoomed-in image 200) and to know the camera matrix for relating 3D coordinates of the scene to 2D coordinates in the original image 100

The process thus moves onto step 1610, in which a point matching process is undertaken using the existence of known features in the scene and the zoomed-in image 200 received with the corner coordinates in step 1606. The point matching process, in embodiments, is explained with reference to FIG. 17.

FIG. 17 again shows the tablet 900 which may be used with the virtual camera cut-out generator 400 and telestrator 500. Here, the tablet 900 is used to perform step 1610 of the telestrator calibration process. Specifically, shown on the tablet screen 902 are the received zoomed-in image 200 and a model image 1700 of the soccer pitch. The soccer pitch model image 1700 includes several features which are known to exist on all professional level soccer pitches. In particular, the model image 1700 comprises the standard lines of a soccer pitch. The aim of the calibration process is to include these standard features in the virtual 3D map of the scene. In embodiments, this is achieved by matching features in the model image 1700 with the real features captured in the zoomed-in image 200.

This matching is achieved by the user first indicating the length and width of the real soccer pitch which is in the scene. This is necessary to ensure that the eventual virtual 3D map of the scene is accurate, since the length and width of different soccer pitches vary. The user can enter the length of the pitch using text field 1704 and the width of the pitch using text field 1706. The length and width must be entered in predetermined units (such as feet or metres, selectable by the user) and can be entered using an on-screen keyboard (not shown) on the tablet 900.

Once the length and width of the pitch have been entered, the user is then required to match certain ones of the standard features 1702A included in the model image 1700 to the corresponding real features 1702B in the zoomed-in image 200. This may be referred to as a point matching process. To do this, the user selects a first standard feature 1702A of the model image 1700 by touching the appropriate part of the model image 1700 with their finger (in this case, the upper left corner of the pitch) and then, once this first standard feature has been selected, the user touches the part of the zoomed-in image 200 in which the corresponding real feature 1702B is present. The user then does this for a second, third, etc. standard feature until a sufficient number of standard features in the model image 1700 have been matched with corresponding real features in the zoomed-in image 200 so as to allow the virtual 3D map to be created. The required number of matched standard features may vary on the algorithm used to generate the virtual 3D map.

It is noted that the user will only be allowed to select standard features on the model image 1700 which have been predetermined for selection. If a user selects a point on the model image 1700 which does not correspond to a predetermined standard feature, then an error will be reported. Alternatively, the predetermined standard feature nearest to the selected point may be used and highlighted.

For each of the matched standard features on the model image 1700 and zoomed-in image 200, a number marker 1708 containing the same number is placed next to the standard feature on both the model image 1700 and zoomed-in image 200. This allows the user to easily identify the standard features from the model image 1700 which have been matched to the zoomed-in image 200 and allows them to easily correct any mistakes. A mistake for a standard feature of the model image 1700 which has already been assigned can be corrected simply by again touching the relevant standard feature 1702A on the model image 1700 and matching it with a new position 1702B on the zoomed-in image 200.

Once the required number of standard features have been matched, the user touches the on-screen button 1710 to complete the calibration process. At this point, the process moves on to step 1612.

Here, the positions of the identified standard features in the zoomed-in image 200 are used, together with the homography determined between the 2D coordinates of the zoomed-in image 200 and the cut-out 105, to determine the positions of the identified standard features in the original image 100. In this case, if the homography is defined by a homography matrix, for example, then the inverse homography matrix will be used to map the 2D positions of the identified standard features on the zoomed-in image 200 to 2D positions in the coordinate system of the original image 100.

Next, the known dimensions of the pitch entered by the user in step 1610 are used to determine the positions of standard features of the pitch (such as the pitch lines, corners and the like) in the 3D coordinate system of the scene, thus determining the virtual 3D map of the scene. The known 2D coordinate positions of the identified standard features in the original image 100 can then be mapped to the 3D positions of those same features in the 3D scene. This allows the camera matrix, which defines the relationship between the 2D coordinate system of the original image 100 and the 3D coordinate system of the scene, to be determined. As already mentioned, the camera matrix may be determined using any suitable method, including via Tsai's Algorithm.

Thus, through the point matching process, the camera matrix, which defines the relationship between the 2D coordinate system of the original image 100 and the 3D coordinate system of the scene, may be determined. When the camera matrix is used in conjunction with the homography determined between the 2D coordinates of the zoomed-in image 200 and the 2D coordinates within a particular cut-out 105, graphical features determined in the 3D coordinate system of the scene (forming the virtual 3D map of the scene) may be applied as telestrator features to any zoomed-in image 200 generated from a cut-out 105 of the original image 100. The virtual 3D map of the scene is stored in the memory 510 of the telestrator 500 so that it may be referred to by the telestrator 500 when applying specific telestrator features to a particular zoomed-in image 200.

The process then ends at step 1614.

Any suitable graphical features can be added to the virtual 3D map of the scene at any time and applied to the zoomed-in image 200 using the camera matrix and cut-out homography. For example, graphics based soccer player position information can be added to the virtual 3D map in real time, allowing telestrator features such as a graphical player identifier or the like to be superimposed on the player in a zoomed-in image 200 as the player moves around.

Advantageously, by using the zoomed-in image 200 for the point matching process, the present disclosure allows the standard features in the soccer pitch model image 1700 to be mapped more accurately by the user to the real features of the pitch in the captured image 100. This is because the zoomed-in image 200 provides a more detailed view of a relevant part of the image 100, and can be selected by the user in accordance with the selection of the point P.

It is noted that, although in the embodiments described above, the original captured image 100 is a single image, the present disclosure may also be used with an original captured image 100 which has been produced by stitching several images together. Any number of images may be stitched together to form the image 100. Embodiments of the present disclosure will work in exactly the same way as described when the image 100 has been generated from a single image 100, as long as a 2D coordinate system is defined for the image 100 and is known to both the cut-out generator 400 and telestrator.

Chroma Keying

The process of chroma keying according to embodiments of the disclosure will now be described. Although chroma keying is a known technique for applying a graphic to a video feed, this known technique requires a background of constant colour onto which the graphic is overlaid.

However, in the case of applying a graphic to a sports pitch (or any outside scene), the colour at any point varies over time depending on several factors which includes movement of shadows. Additionally, during a sports event, the pitch at any position may be affected by damage to the pitch (i.e. the grass being damaged so the colour at that position changes from green to brown).

Figure 18A:
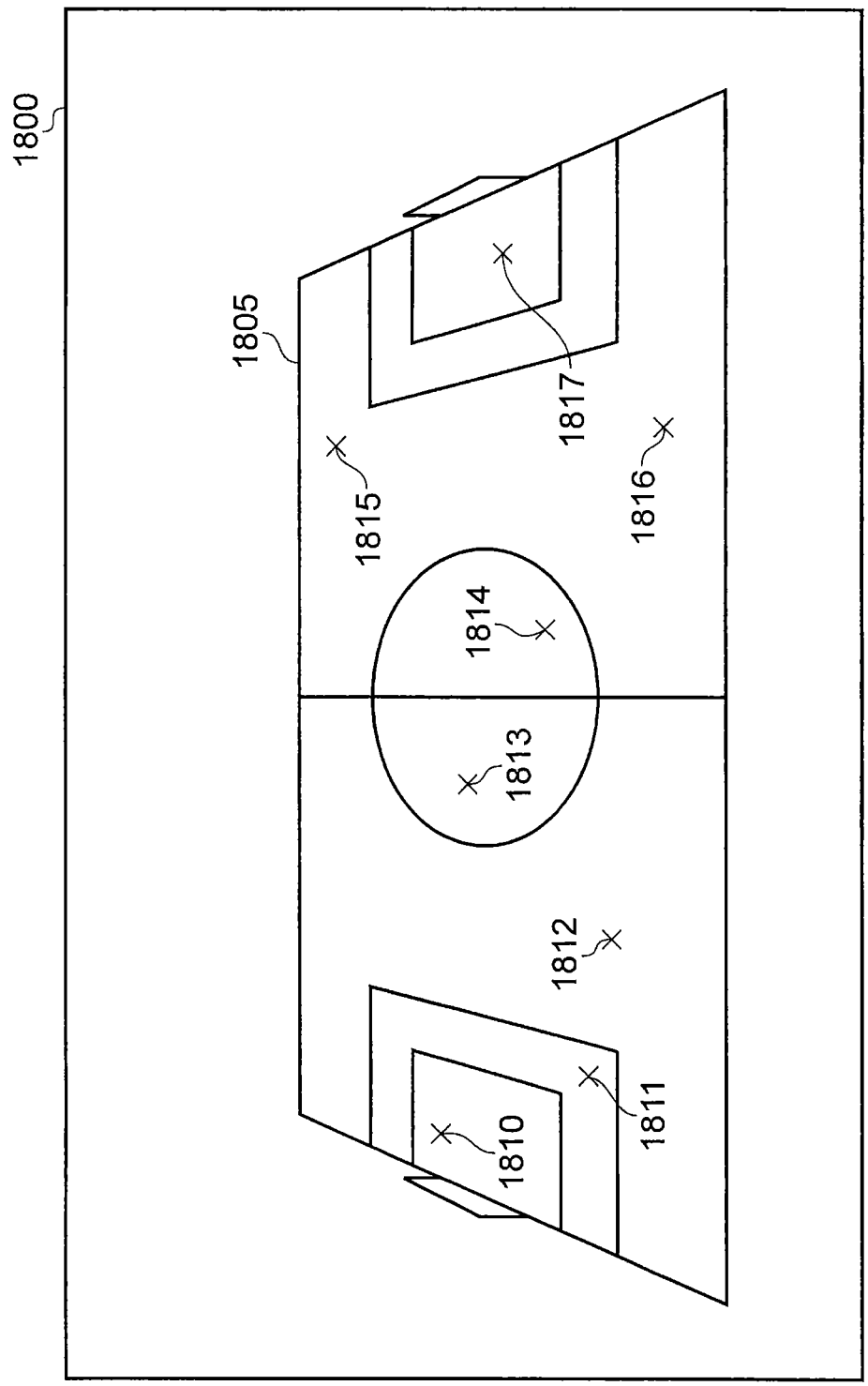
FIGS. 18A-D shows specified points on an ultra-high definition image and the effect of shadow on such an image.

FIG. 18A shows another example of an ultra-high definition image 1800 formed from at least two lower definition images stitched together. Although in embodiments this results in an 8K resolution image, the disclosure is not limited in any way to any particular size of image or method of capture of image.

The image 1800 is of a soccer pitch 1805. The user of the telestrator of FIG. 5 marks on the image 1800 several positions. These are indicated on the soccer pitch 1805 as points 1810 to 1817. In embodiments of the disclosure, any number of points may be selected and/or any position of the points within the image 1800 may be selected. Indeed, the points need not be located on the soccer pitch 1805.

The points define positions where the colour of the image 1800 needs to be defined. In particular, by defining the colour at these positions, it is possible to obtain a representative chrominance and luminance value for a particular segment of the image 1800 as will be explained later. The combination of the chrominance and luminance will be hereinafter referred to as "colour" as would be appreciated by the skilled person. The colour value for the particular segment of the image 1800 will be used to enable a graphic to be overlaid onto at least part of that particular segment of the image 1800 as will be explained later.

Although any points may be defined in the image 1800, the user will select points in the image which are likely to be in shadow and out of shadow during the course of the broadcast. Further, the user will select points which are likely to change colour during the course of the broadcast. So, in the soccer scenario, heavily trafficked areas which are likely to change from green to brown. Finally, the user is likely to select areas where graphics are to be placed. These are usually defined in advance by a producer of the programme and, in the context of a soccer match, may include the penalty box and the centre circle.

Although any mechanism may be used for the user to define the points, it is envisaged that the user may wish to use a tablet device or a computer with mouse and/or keyboard attached and will simply select one or more points on the image 1800.

Figure 18B:
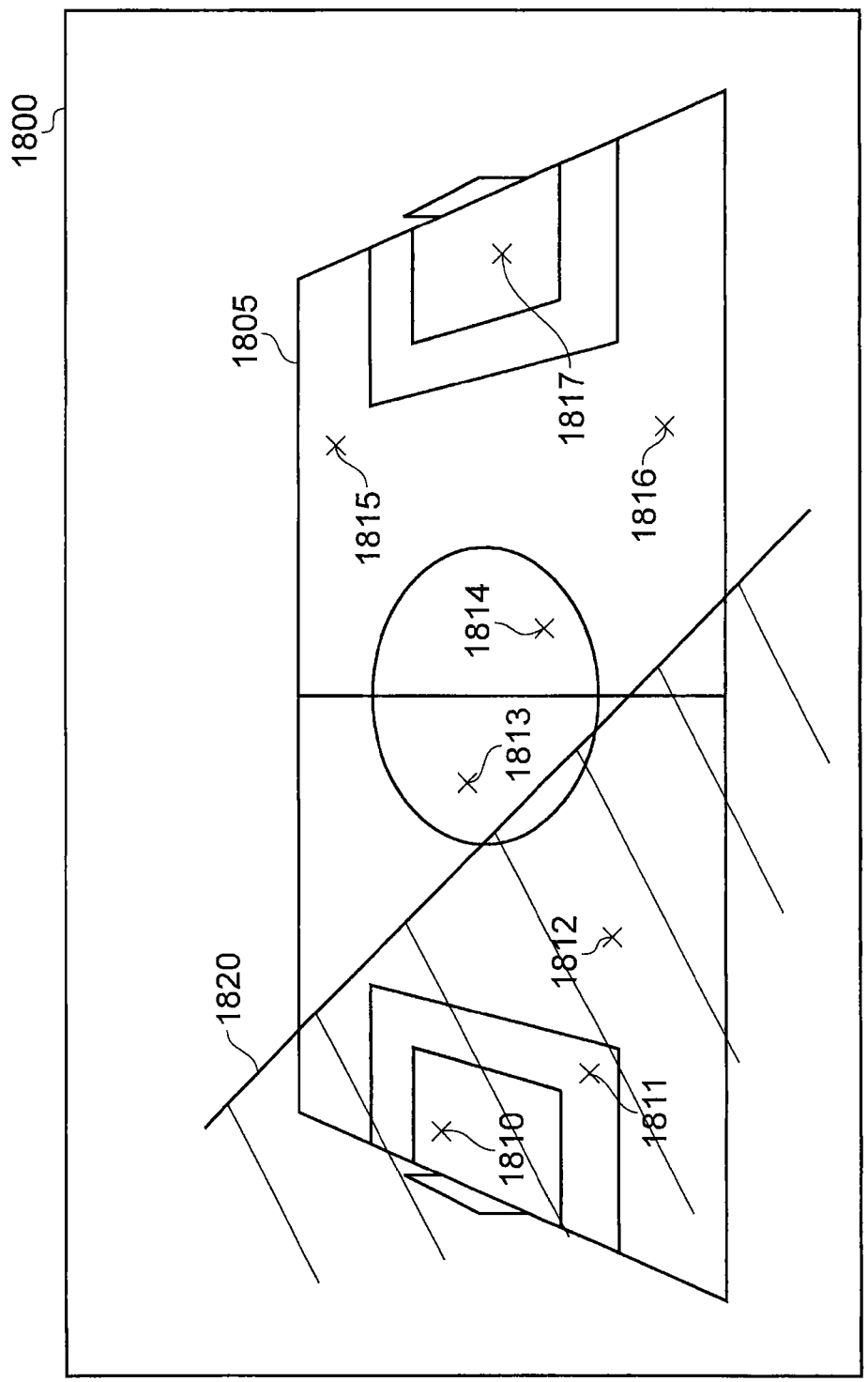

FIG. 18B shows the image 1800 of FIG. 18A with a shadow 1820 being cast across the soccer pitch 1805 at a point in time. Clearly, during this time, selected points 1810, 1811 and 1812 will have different colour values compared to a different time when these points are out of the shadow 1820. These colour differences are computed in the CIE L*a*b* colour space using the CMC 1:c colour distance metric as would be appreciated. In this instance L is the lightness of the colour, and a and b are the so-called colour opponent dimensions. However, if a graphic needed to be inserted into the penalty box on the left side of the pitch (which is in shadow in FIG. 18B), the colour values of points 1810, 1811 and 1812 at that point in time will be important compared to the colour values of these points when out of shadow.

Figure 18C:
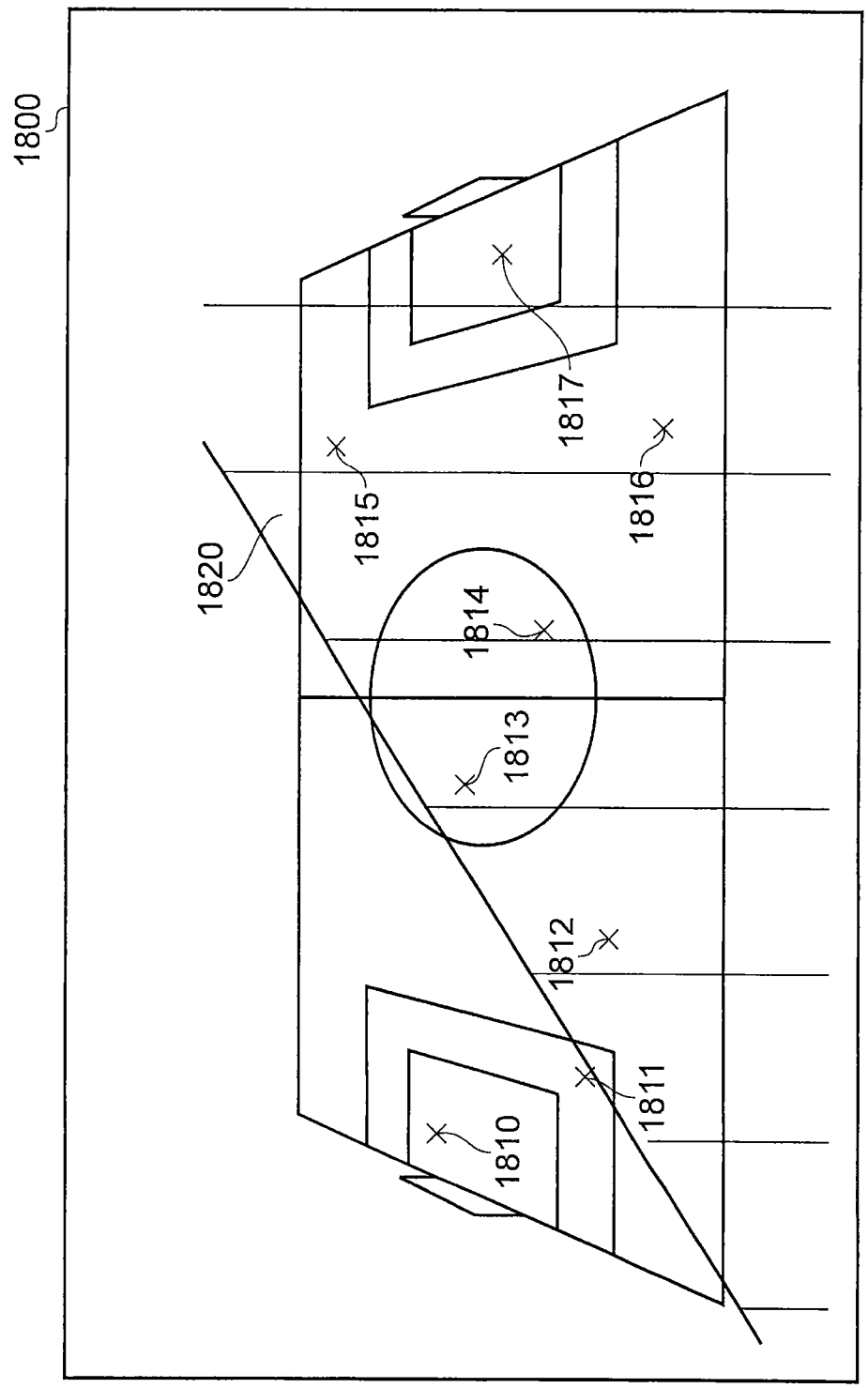

FIG. 18C shows the image 1800 of FIG. 18A with a shadow 1820 being cast across a different part of the soccer pitch 1805 at a different point in time. Clearly, during this time, selected points 1812 to 1817 will have different colour values compared to a different time when these points are out of the shadow 1820. However, if a graphic needed to be inserted into the penalty box on the right side of the pitch (which is in shadow in FIG. 18c), the colour values of points 1812 to 1817 at that point in time will be important compared to the colour values of these points when out of shadow.

Figure 18D:
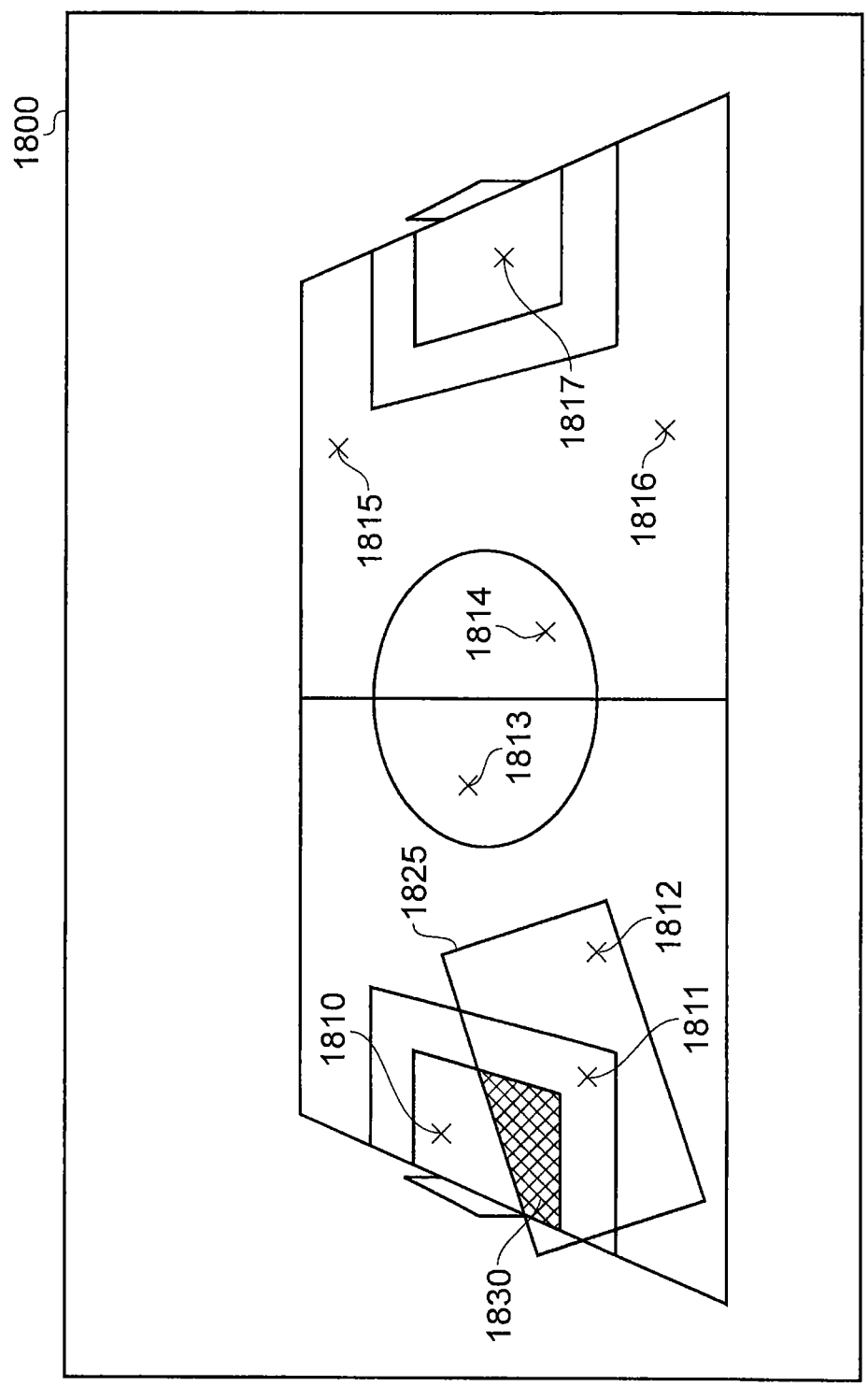

FIG. 18D shows the image 1800 of FIG. 18A with a segment 1825 being cut-out. The cut-out will be a smaller resolution compared to the resolution of the image 1800. So, for example, as noted above, if the image 1800 is an ultra-high definition image such as an 8K image, then the cut-out may be a high definition image. The cut-out is intended for viewing on a display such as a high definition television or tablet or the like.

Within the cut-out, the telestrator 500 must insert a graphic in the area 1830 indicated by the hatched lines in FIG. 18D. Therefore, the colour value of each pixel in the area 1830 must be established in order for the graphic to be inserted using a chroma key technique. This determines whether the pixel is a foreground pixel or a background pixel.

In order for the telestrator 500 to calculate the colour value of each pixel in area 1830 and to determine whether that pixel is a foreground pixel or background pixel, it is necessary for the telestrator 500 to store the colour values of the visible specified points (i.e. those in cut-out 1825) at any particular point in time. In order to achieve this, a table as shown in FIG. 19 is stored in the memory 505 of the telestrator 500.

In this case, only the L*a*b* values for the visible specified points are stored (the non-visible specified points having a blank entry for L*a*b* in the database)

At each time interval each specified point is identified by a unique identifier and the co-ordinate position of the specified point is stored in association with the point. The co-ordinate position is the co-ordinate in the image 1800 (or in the real life scene) where the specified point is located. The co-ordinate position may be either a 3D position of the specified point on the pitch (this would be in metres) or a 2D co-ordinate in the ultra high definition image 1800. In embodiments, the 3D co-ordinate is used as the 2D co-ordinate would be invalidated should the camera capturing the ultra-high definition image be moved by even a small amount. It is possible to calculate the 3D position in a real-life scene from the position in an image using the techniques noted above. As the key location is specified in 3D co-ordinates, it is possible to find the 3D co-ordinate at a later time wherever the virtual camera is pointing. This is important as the colour value at each visible specified point (i.e. in the virtual camera field of view) is calculated at a specified time interval. At each time interval, the colour value at each visible specified point is determined and stored in the table. In embodiments, the time interval is every frame, or the time interval may be every second, or every 5 or 10 seconds or the like. The time interval may be selected according to the requirements of the user.

In order to overlay the graphic, the telestrator 500 first renders a video layer. This video layer is the cut-out 1825 in FIG. 18D. The graphics are then rendered on top of the video layer with a set translucency. In other words, the graphic is overlaid onto the video layer and the degree to which the graphic may be seen through is set. Finally, the telestrator 500 renders the video layer again. However, this time, only the foreground objects (such as soccer players in the example embodiment) are rendered on top of the graphics layer. In order to determine which pixels are foreground pixels (i.e. players) and which are background pixels (i.e. pitch) a foreground alpha mask is produced which will be described later. However, by rendering the players on top of the graphics and rendering the graphics on top of the pitch, complex graphics may be inserted into the broadcast image.

As noted above, the telestrator 500 must determine which pixels are foreground pixels and which pixels are background pixels. This is achieved by creating a so-called foreground alpha mask. In order to calculate the foreground alpha mask, the colour difference between a current pixel value in L*a*b* format (taken from the cut out 1825), and each of the visible specified points from the table shown in FIG. 19 is calculated. This difference is calculated using the CMC 1:c colour distance metric as would be appreciated by the skilled person.

The minimum difference is then selected. The probability that the current pixel is a foreground pixel or a background pixel is then calculated using the difference value for each key colour and a variance parameter.

$$P_f = 1 - \mathrm{argmax}_i \left( e^{\frac{-d_i^2}{2\sigma_i^2}} \right)$$

Where $P_f$ is the foreground probability, i is the key colour index, $d_i$ is the CMC colour distance between the pixel colour and key colour i and $\sigma_i^2$ is the variance of key colour i. This variance parameter may be learned on-site or specified a priori. This results in a number that varies between 0 and 1 where 0 is a background pixel and 1 is a foreground pixel. In graphics, this is disadvantageous as it is desirable to have a binary result (either foreground or background) with a small ramp either side to produce soft edges on the graphics.

One technique that may be used to achieve this is to implement binarisation. In other words, choose a threshold value and below this threshold set the value to 0 and above this threshold set the value to 1. It is then possible to smooth over the sharp edges to achieve the small ramp. The inventors have found that this is not an optimal solution, however. Specifically, in an outdoor scenario, like applying graphics to a soccer match, the colour of the soccer kit may match one of the specified points closely or during the match, large areas of the kit have grass stains and mud stains which are part of the background colour. This results in large regions of the cut-out image whose colour of the foreground pixels closely match the colour of the background pixels. The binarisation process may then flicker as the colour value oscillates above and below the threshold.

Instead, in embodiments, a logistic compression curve is applied to the results of the probability function. This allows most values to be forced to either 0 or 1 and so achieving the binarisation effect that is desirable. However, in the case of values close to the threshold, these values will retain intermediate values between 0 and 1. This is advantageous because instead of flickering continuously, the graphic is rendered at an approximately constant level of translucency.

In order to reduce the amount of processing required in the system, it is possible to determine player tracking information to establish the position of each player on the pitch. The method to extract this information is known. See, for example, GB0717277.8 whose content is hereby incorporated by reference. Once the position of each player on the pitch has been established, this information may be used as follows. As the player on the pitch will be in the foreground, by establishing the position of the player, the pixels making up the player in the image will not need to be checked. In other words, the regions in which the players are located will be deemed to be foreground pixels. This reduces processing power. Of course, although player tracking is mentioned, the principles may be applied to any object located in the foreground.

Although it is possible to have a table with a single value for colour for each point (i.e. every time interval the previous value of colour is overwritten) to be memory efficient, it is possible to store the colour value for each time interval over the entire broadcast. This allows graphics to be added after the broadcast has been completed. It is the latter case shown in FIG. 19.

Further, although the above has been described with the specified points remaining unchanged during the broadcast, it is envisaged that the user of the telestrator 500 may select more specified points during the broadcast. Also, the user of the telestrator 500 may remove or replace specified points as they see fit. Further, although L*a*b* values have been mentioned above, any suitable colour characteristic is envisaged. For example, the Y, Cr, Cb value or the hue, saturation and lightness (HSL) or hue, saturation and value (HSV) values may be used instead of or in addition to the RGB values. However, it should be noted that the use of L*a*b* is particularly advantageous because the L*a*b* values are more perceptually uniform than RGB or YCbCr. This is because the Euclidean distance between two colours in L*a*b* more closely models the difference in colour perceived by a human observer compared with colours defined in RGB or YCbCr. Further, L*a*b* also separates the chrominance and the luminance values which is useful as luminance has a higher variance, which is effective for shadows, highlights etc. The use of YCbCr in the source signal is further useful as this is used to transmit image data in MPEG and HD-SDI and this signal also separates chrominance and luminance values.

Although the above describes the calculation of a colour value at a single specified point, it is envisaged that a plurality of the specified points may be clustered and the colour value of the cluster calculated and used as a value for a specified point. This clustering may be achieved using K-means clustering or another clustering technique. This is advantageous because there may be a large number of key locations (specified points) entered by the user. As processing time for chroma-key processing is proportional to the number of keys (or specified points), for a large number of specified points processing restraints may not enable real-time processing. However, by dynamically clustering the specified points in this manner, it is possible to restrict the number of specified points for which the colour difference is calculated. Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Clauses

Embodiments of the present disclosure can be generally defined by the following numbered paragraphs:

1. A device for superimposing a graphic on a second image generated from a cut-out of a first image of a scene, the cut-out representing the field of view of a virtual camera, the device comprising:

receiver circuitry configured to receive the second image and a set of cut-out corner coordinates, each of the cut-out corner coordinates giving a position of a corner point of the cut-out in a first two-dimensional (2D) coordinate system defined for the first image;

homography determining circuitry configured to determine, from the set of cut-out corner coordinates, a homography between coordinates of the first 2D coordinate system defined within the cut-out and coordinates of a second 2D coordinate system defined for the second image;

feature determining circuitry configured to determine, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera;

graphic generator circuitry configured to generate the graphic from the determined feature of the virtual 3D map; and graphic superimposing circuitry configured to superimpose the generated graphic on the second image.

2. A device according to clause 1, comprising point selection circuitry configured to receive the selection of a single point in the first 2D coordinate system defined for the first image and determine, from the selected point, a yaw, pitch and roll of the virtual camera, the single point defining a point within the cut-out.

3. A device according to clause 2, wherein:
upon selection of the single point and/or a focal length of the virtual camera, the yaw, pitch, roll and/or focal length of the virtual camera are gradually changed until the yaw, pitch and/or roll associated with the single point are reached and/or the selected focal length is reached; and
as the yaw, pitch, roll and/or focal length of the virtual camera are gradually changed, a plurality of second images and respective sets of cut-out corner coordinates are successively received at a predetermined frame rate.

4. A device according to clause 3, wherein the speed of the gradual change of the yaw, pitch, roll and/or focal length of the virtual camera is determined by a damping coefficient which is selectable by the user.

5. A device according to any one of clauses 3-4, wherein the yaw, pitch, roll and/or focal length of the virtual camera are controlled in accordance with a predetermined virtual camera motion sequence, the virtual camera motion sequence being defined by a time sequence of selected single point, focal length and/or damping coefficients.

6. A device according to any preceding clause, wherein:
a plurality of second images and respective sets of cut-out corner coordinates are received simultaneously;
the yaw, pitch, roll and/or focal length of the virtual camera associated with a first one of the second images are different to the yaw, pitch, roll and/or focal length of the virtual camera associated with a second one of the second images; and
the device comprises image combination circuitry configured to combine the first one of the second images and the second one of the second images to form a third image.

7. The device according to clause 6, wherein the yaw, pitch, roll and/or focal length of the virtual camera associated with the first one of the second images and the yaw, pitch, roll and/or focal length of the virtual camera associated with the second one of the second images are such that the cut-out corresponding to the second one of the second images is within the cut-out corresponding to the first one of the second images.

8. The device according to any preceding clause, comprising calibration circuitry for determining the camera matrix using the received second image, the calibration circuitry being configured to:
associate each of a plurality features of the virtual 3D map of the scene with a respective real image feature in the second image, and determine the position of each real image feature in the second 2D coordinate system of the second image;
determine the position of each real image feature in the first 2D coordinate system of the first image using the homography; and
determine the camera matrix from the position of each real image feature in the first 2D coordinate system of the first image and the 3D position of each respective feature in the virtual 3D map of the scene.

9. A method for superimposing a graphic on a second image generated from a cut-out of a first image of a scene, the cut-out representing the field of view of a virtual camera, the method comprising:
receiving the second image and a set of cut-out corner coordinates, each of the cut-out corner coordinates giving a position of a corner point of the cut-out in a first two-dimensional (2D) coordinate system defined for the first image;
determining, from the set of cut-out corner coordinates, a homography between coordinates of the first 2D coordinate system defined within the cut-out and coordinates of a second 2D coordinate system defined for the second image;
determining, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera;
generating the graphic from the determined feature of the virtual 3D map; and
superimposing the generated graphic on the second image.

10. A method according to clause 9, comprising receiving the selection of a single point in the first 2D coordinate system defined for the first image and determine, from the selected point, a yaw, pitch and roll of the virtual camera, the single point defining a point within the cut-out.

11. A method according to clause 10, wherein:
upon selection of the single point and/or a focal length of the virtual camera, the yaw, pitch, roll and/or focal length of the virtual camera are gradually changed until the yaw, pitch and/or roll associated with the single point are reached and/or the selected focal length is reached; and
as the yaw, pitch, roll and/or focal length of the virtual camera are gradually changed, a plurality of second images and respective sets of cut-out corner coordinates are successively received at a predetermined frame rate.

12. A method according to clause 11, wherein the speed of the gradual change of the yaw, pitch, roll and/or focal length of the virtual camera is determined by a damping coefficient which is selectable by the user.

13. A method according to any one of clauses 11-12, wherein the yaw, pitch, roll and/or focal length of the virtual camera are controlled in accordance with a predetermined virtual camera motion sequence, the virtual camera motion sequence being defined by a time sequence of selected single point, focal length and/or damping coefficients.

14. A method according to any one of clauses 9 to 13, wherein:
a plurality of second images and respective sets of cut-out corner coordinates are received simultaneously;
the yaw, pitch, roll and/or focal length of the virtual camera associated with a first one of the second images are different to the yaw, pitch, roll and/or focal length of the virtual camera associated with a second one of the second images; and the device comprises image combination circuitry configured to combine the first one of the second images and the second one of the second images to form a third image.

15. The method according to clause 14, wherein the yaw, pitch, roll and/or focal length of the virtual camera associated with the first one of the second images and the yaw, pitch, roll and/or focal length of the virtual camera associated with the second one of the second images are such that the cut-out corresponding to the second one of the second images is within the cut-out corresponding to the first one of the second images.

16. The method according to any one of clauses 9 to 15, comprising determining the camera matrix using the received second image, the calibration circuitry being configured to:

associate each of a plurality features of the virtual 3D map of the scene with a respective real image feature in the second image, and determine the position of each real image feature in the second 2D coordinate system of the second image;

determine the position of each real image feature in the first 2D coordinate system of the first image using the homography; and determine the camera matrix from the position of each real image feature in the first 2D coordinate system of the first image and the 3D position of each respective feature in the virtual 3D map of the scene.

17. A program for controlling a computer to perform the method according to any one of clauses 9 to 16.

18. A recording medium storing a program according to clause 17.

19. A method, device, program or recording medium as substantially hereinbefore described with reference to the accompanying drawings.

The invention claimed is:

1. A device for superimposing a graphic on a second image generated from a cut-out of a first image of a scene, the cut-out representing the field of view of a virtual camera, the device comprising:

receiver circuitry configured to receive the second image and a set of cut-out corner coordinates, each of the cut-out corner coordinates giving a position of a corner point of the cut-out in a first two-dimensional (2D) coordinate system defined for the first image;

homography determining circuitry configured to determine, from the set of cut-out corner coordinates, a homography between coordinates of the first 2D coordinate system defined within the cut-out and coordinates of a second 2D coordinate system defined for the second image;

feature determining circuitry configured to determine, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera;

graphic generator circuitry configured to generate the graphic from the determined feature of the virtual 3D map;

graphic superimposing circuitry configured to superimpose the generated graphic on the second image; and point selection circuitry configured to receive the selection of a single point in the first 2D coordinate system defined for the first image and determine, from the selected point, a yaw, pitch and roll of the virtual camera, the single point defining a point within the cut-out, wherein:

upon selection of the single point and/or a focal length of the virtual camera, the yaw, pitch, roll and/or focal length of the virtual camera are gradually changed until the yaw, pitch and/or roll associated with the single point are reached and/or the selected focal length is reached; and as the yaw, pitch, roll and/or focal length of the virtual camera are gradually changed, a plurality of second images and respective sets of cut-out corner coordinates are successively received at a predetermined frame rate.

2. The device according to claim 1, wherein the speed of the gradual change of the yaw, pitch, roll and/or focal length of the virtual camera is determined by a damping coefficient which is selectable by the user.

3. The device according to claim 1, wherein the yaw, pitch, roll and/or focal length of the virtual camera are controlled in accordance with a predetermined virtual camera motion sequence, the virtual camera motion sequence being defined by a time sequence of selected single point, focal length and/or damping coefficients.

4. A device for superimposing a graphic on a second image generated from a cut-out of a first image of a scene, the cut-out representing the field of view of a virtual camera, the device comprising:

receiver circuitry configured to receive the second image and a set of cut-out corner coordinates, each of the cut-out corner coordinates giving a position of a corner point of the cut-out in a first two-dimensional (2D) coordinate system defined for the first image;

homography determining circuitry configured to determine, from the set of cut-out corner coordinates, a homography between coordinates of the first 2D coordinate system defined within the cut-out and coordinates of a second 2D coordinate system defined for the second image;

feature determining circuitry configured to determine, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera;

graphic generator circuitry configured to generate the graphic from the determined feature of the virtual 3D map;

graphic superimposing circuitry configured to superimpose the generated graphic on the second image, wherein a plurality of second images and respective sets of cut-out corner coordinates are received simultaneously, the yaw, pitch, roll and/or focal length of the virtual camera associated with a first one of the second images are different to the yaw, pitch, roll and/or focal length of the virtual camera associated with a second one of the second images, the device comprises image combination circuitry configured to combine the first one of the second images and the second one of the second images to form a third image, and the yaw, pitch, roll and/or focal length of the virtual camera associated with the first one of the second images and the yaw, pitch, roll and/or focal length of the virtual camera associated with the second one of the second images are such that the cut-out corresponding to the second one of the second images is within the cut-out corresponding to the first one of the second images.

5. The device according to claim 1, comprising calibration circuitry for determining the camera matrix using the received second image, the calibration circuitry being configured to:

associate each of a plurality features of the virtual 3D map of the scene with a respective real image feature in the second image, and determine the position of each real image feature in the second 2D coordinate system of the second image;

determine the position of each real image feature in the first 2D coordinate system of the first image using the homography; and determine the camera matrix from the position of each real image feature in the first 2D coordinate system of the first image and the 3D position of each respective feature in the virtual 3D map of the scene.

6. A method performed by an information processing apparatus for superimposing a graphic on a second image generated from a cut-out of a first image of a scene, the cut-out representing the field of view of a virtual camera, the method comprising:

receiving, by circuitry of the information processing apparatus, the second image and a set of cut-out corner coordinates, each of the cut-out corner coordinates giving a position of a corner point of the cut-out in a first two-dimensional (2D) coordinate system defined for the first image;

determining, by the circuitry, from the set of cut-out corner coordinates, a homography between coordinates of the first 2D coordinate system defined within the cut-out and coordinates of a second 2D coordinate system defined for the second image;

determining, by the circuitry, from the homography, from a camera matrix representing a relationship between a three-dimensional (3D) coordinate system defined for the scene and the first 2D coordinate system defined for the first image, and from a virtual 3D map of the scene defining features of the scene in the 3D coordinate system of the scene, a feature of the virtual 3D map of the scene within the field of view of the virtual camera;

generating, by the circuitry, the graphic from the determined feature of the virtual 3D map;

superimposing, by the circuitry, the generated graphic on the second image; and receiving the selection of a single point in the first 2D coordinate system defined for the first image and determining, from the selected point, a yaw, pitch and roll of the virtual camera, the single point defining a point within the cut-out, wherein:

upon selection of the single point and/or a focal length of the virtual camera, the yaw, pitch, roll and/or focal length of the virtual camera are gradually changed until the yaw, pitch and/or roll associated with the single point are reached and/or the selected focal length is reached; and as the yaw, pitch, roll and/or focal length of the virtual camera are gradually changed, a plurality of second images and respective sets of cut-out corner coordinates are successively received at a predetermined frame rate.

7. The method according to claim 6, wherein the speed of the gradual change of the yaw, pitch, roll and/or focal length of the virtual camera is determined by a damping coefficient which is selectable by the user.

8. The method according to claim 6, wherein the yaw, pitch, roll and/or focal length of the virtual camera are controlled in accordance with a predetermined virtual camera motion sequence, the virtual camera motion sequence being defined by a time sequence of selected single point, focal length and/or damping coefficients.

9. The method according to claim 6, wherein:

a plurality of second images and respective sets of cut-out corner coordinates are received simultaneously;

the yaw, pitch, roll and/or focal length of the virtual camera associated with a first one of the second images are different to the yaw, pitch, roll and/or focal length of the virtual camera associated with a second one of the second images; and the method further comprises combining, by the circuitry, the first one of the second images and the second one of the second images to form a third image.

10. The method according to claim 9, wherein the yaw, pitch, roll and/or focal length of the virtual camera associated with the first one of the second images and the yaw, pitch, roll and/or focal length of the virtual camera associated with the second one of the second images are such that the cut-out corresponding to the second one of the second images is within the cut-out corresponding to the first one of the second images.

11. The method according to claim 6, comprising:

determining the camera matrix using the received second image;

associating each of a plurality features of the virtual 3D map of the scene with a respective real image feature in the second image, and determining the position of each real image feature in the second 2D coordinate system of the second image;

determining the position of each real image feature in the first 2D coordinate system of the first image using the homography; and determining the camera matrix from the position of each real image feature in the first 2D coordinate system of the first image and the 3D position of each respective feature in the virtual 3D map of the scene.

12. A non-transitory computer readable medium including computer program instructions, which when executed by the circuitry of the information processing apparatus, causes the circuitry to perform the method of claim 6.

* * * * *